US012699727B1

(12) United States Patent
Kimmel et al.

(10) Patent No.: US 12,699,727 B1
(45) Date of Patent: Aug. 4, 2026

(54) MULTIMEDIA INTELLIGENCE AGENT

(71) Applicant: LUMANA INC., Sunnyvale, CA (US)

(72) Inventors: Ron Kimmel, Haifa (IL); Ron Slossberg, Raanana (IL); Aviad Zabatani, Kfar Vitkin (IL); Sagi Ben Moshe, Ein Ayala (IL); Ofir Mulla, Talme Elazar (IL); Noam Rotstein, Haifa (IL); Tomer Weiss, Kadarim (IL)

(73) Assignee: LUMANA INC., Sunnyvale, CA (US)

( * ) Notice: Subject to any disclaimer, the term of this patent is extended or adjusted under 35 U.S.C. 154(b) by 0 days.

(21) Appl. No.: 19/184,423

(22) Filed: Apr. 21, 2025

(51) Int. Cl.
*G06F 16/435* (2019.01)
*G06F 16/242* (2019.01)

(52) U.S. Cl.
CPC .......... *G06F 16/435* (2019.01); *G06F 16/243* (2019.01); *G06F 16/2438* (2019.01)

(58) Field of Classification Search
CPC ... G06F 16/435; G06F 16/243; G06F 16/2438
USPC ........................................ 707/765
See application file for complete search history.

(56) References Cited

U.S. PATENT DOCUMENTS

| | | | |
|---|---|---|---|
| 4,604,694 A | 8/1986 | Hough | |
| 5,339,427 A | 8/1994 | Elko et al. | |
| 9,152,666 B2 | 10/2015 | Lin et al. | |
| 10,049,308 B1 | 8/2018 | Dhua et al. | |
| 10,223,604 B2 | 3/2019 | Bahl et al. | |
| 11,238,093 B2 | 2/2022 | Ayush et al. | |

| | | | |
|---|---|---|---|
| 11,314,985 B2 | 4/2022 | Clayton et al. | |
| 11,631,162 B2 | 4/2023 | Price et al. | |
| 11,676,247 B2 | 6/2023 | Zimmer et al. | |
| 11,842,727 B2 | 12/2023 | Metallinou et al. | |
| 11,862,171 B2 | 1/2024 | Li et al. | |
| 11,886,828 B1 | 1/2024 | Gray et al. | |

(Continued)

FOREIGN PATENT DOCUMENTS

| | | |
|---|---|---|
| CN | 110868598 B | 6/2021 |
| CN | 116541490 A | 8/2023 |

(Continued)

OTHER PUBLICATIONS

English translation of CN119597785A using Google Patents. Publication date Mar. 11, 2025. 9 pages. (Year: 2025).*

(Continued)

*Primary Examiner* — Kimberly L Wilson
(74) *Attorney, Agent, or Firm* — M&B IP Analysts, LLC

(57) ABSTRACT

A system and method for structured querying. A method includes embedding text of a request to create an embedding. The embedding is compared to query structure examples. Each query structure example includes natural language text and a structured query. The structured query of each query structure example is structured according to a format used by a database. Matching query structure examples are identified among the query structure examples based on the comparison. A first query is generated based on the matching query structure examples and the text of the request. The first query is provided to a language model in order to obtain a set of outputs. At least a portion of the database is queried using a second query. The second query is based on the set of outputs from the language model and is structured according to the format used by the database.

17 Claims, 10 Drawing Sheets

(56) References Cited

U.S. PATENT DOCUMENTS

| | | | |
|---|---|---|---|
| 11,947,923 B1 | 4/2024 | Jain et al. | |
| 11,977,854 B2 | 5/2024 | Tunstall-Pedoe et al. | |
| 11,989,527 B2 | 5/2024 | Tunstall-Pedoe et al. | |
| 11,995,412 B1 | 5/2024 | Mishra | |
| 12,008,739 B2 | 6/2024 | Xu et al. | |
| 12,073,180 B2 | 8/2024 | Tunstall-Pedoe et al. | |
| 2015/0012661 A1 | 1/2015 | Elmore | |
| 2015/0213056 A1 | 7/2015 | Maluf et al. | |
| 2020/0242774 A1 | 7/2020 | Park et al. | |
| 2021/0097691 A1 | 4/2021 | Liu | |
| 2021/0218819 A1 | 7/2021 | Lawson et al. | |
| 2021/0256061 A1* | 8/2021 | Janakiraman | G06F 16/738 |
| 2021/0326674 A1 | 10/2021 | Liu et al. | |
| 2021/0365736 A1 | 11/2021 | Kearney et al. | |
| 2022/0067994 A1 | 3/2022 | Neuberger et al. | |
| 2022/0138170 A1* | 5/2022 | Misiewicz | G06N 5/022 707/737 |
| 2022/0180447 A1 | 6/2022 | Kearney et al. | |
| 2022/0207707 A1 | 6/2022 | Yang et al. | |
| 2022/0383864 A1 | 12/2022 | Gruber et al. | |
| 2022/0398247 A1* | 12/2022 | Wu | G06F 16/24522 |
| 2023/0042224 A1 | 2/2023 | Patel et al. | |
| 2023/0126177 A1 | 4/2023 | Xu et al. | |
| 2023/0169074 A1* | 6/2023 | Kim | G06F 40/247 704/9 |
| 2023/0177683 A1 | 6/2023 | Lenis et al. | |
| 2023/0326212 A1 | 10/2023 | Chawda et al. | |
| 2023/0342884 A1 | 10/2023 | Singh et al. | |
| 2023/0351102 A1 | 11/2023 | Tran | |
| 2024/0062067 A1 | 2/2024 | Hu et al. | |
| 2024/0143835 A1 | 5/2024 | Khodadadeh et al. | |
| 2024/0205405 A1 | 6/2024 | Tanaka et al. | |
| 2024/0252048 A1 | 8/2024 | Tran | |
| 2024/0320807 A1 | 9/2024 | Zhong et al. | |
| 2024/0338802 A1 | 10/2024 | Yoon et al. | |
| 2024/0347059 A1 | 10/2024 | Manjunath et al. | |
| 2025/0053732 A1 | 2/2025 | Itani | |
| 2025/0077509 A1* | 3/2025 | Schindel | G06F 16/243 |
| 2025/0086211 A1* | 3/2025 | Bolcer | G06F 16/3344 |
| 2025/0148657 A1 | 5/2025 | Hirota et al. | |

FOREIGN PATENT DOCUMENTS

| | | |
|---|---|---|
| CN | 117725259 A | 3/2024 |
| CN | 117743610 A | 3/2024 |
| CN | 117972127 A | 5/2024 |
| CN | 118051635 A | 5/2024 |
| WO | 2023161630 A1 | 8/2023 |

OTHER PUBLICATIONS

English Translation of CN117112590A to Sun et al (Year: 2023).*

O'Connor, Ryan. "Introduction to Diffusion Models for Machine Learning." AssemblyAI, May 12, 2022, www.assemblyai.com/blog/diffusion-models-for-machine-learning-introduction/. Date Accessed Dec. 14, 2023.

Kirichenko, Polina, Pavel Izmailov, and Andrew Gordon Wilson. "Last layer re-training is sufficient for robustness to spurious correlations." arXiv preprint arXiv:2204.02937 (2022). (Year: 2022).

Liusie, Adian, Potsawee Manakul, and Mark Gales. "Mitigating word bias in zero-shot prompt-based classifiers." Findings of the Association for Computational Linguistics: IJCNLP-AACL 2023 (Findings). 2023. (Year: 2023).

* cited by examiner

MULTIMEDIA INTELLIGENCE AGENT

TECHNICAL FIELD

The present disclosure relates generally to artificial intelligence (AI) solutions for processing multimedia, and more specifically to AI agents configured to interact with multimedia content.

BACKGROUND

Artificial intelligence models such as large language models (LLMs) have changed how users interact with chat bots, digital assistants, and other computer programs. LLMs provide the ability for users to interact with such systems in natural language rather than requiring predetermined schemes or formats, and without converting natural language into such schemes or formats. While programs powered by AI models like LLMs may have some ability to answer questions about content used for training those models, the ability for language-based models to respond to prompts related to multimedia content faces significant hurdles which prevents many existing solutions from adequately responding to these kinds of prompts.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for structured querying. The method comprises: embedding text of a request in order to create an embedding; comparing the embedding to at least a portion of each of a plurality of query structure examples during a comparison, wherein each query structure example of the plurality of query structure examples includes a natural language text portion and a structured query portion, wherein the structured query portion of each query structure example is structured according to a format used by a database; identifying at least one matching query structure example among the plurality of query structure examples based on the comparison; generating a first query based on the at least one matching query structure example and the text of the request; providing the first query to a language model in order to obtain a set of outputs from the language model; and querying at least a portion of the database using a second query, wherein the second query is based on the set of outputs from the language model, wherein the second query is structured according to the format used by the database.

Certain embodiments disclosed herein also include a non-transitory computer-readable medium having stored thereon causing a processing circuitry to execute a process, the process comprising: embedding text of a request in order to create an embedding; comparing the embedding to at least a portion of each of a plurality of query structure examples during a comparison, wherein each query structure example of the plurality of query structure examples includes a natural language text portion and a structured query portion, wherein the structured query portion of each query structure example is structured according to a format used by a database; identifying at least one matching query structure example among the plurality of query structure examples based on the comparison; generating a first query based on the at least one matching query structure example and the text of the request; providing the first query to a language model in order to obtain a set of outputs from the language model; and querying at least a portion of the database using a second query, wherein the second query is based on the set of outputs from the language model, wherein the second query is structured according to the format used by the database.

Certain embodiments disclosed herein also include a system for structured querying. The system comprises: a processing circuitry; and a memory, the memory containing instructions that, when executed by the processing circuitry, configure the system to: embed text of a request in order to create an embedding; compare the embedding to at least a portion of each of a plurality of query structure examples during a comparison, wherein each query structure example of the plurality of query structure examples includes a natural language text portion and a structured query portion, wherein the structured query portion of each query structure example is structured according to a format used by a database; identify at least one matching query structure example among the plurality of query structure examples based on the comparison; generate a first query based on the at least one matching query structure example and the text of the request; provide the first query to a language model in order to obtain a set of outputs from the language model; and query at least a portion of the database using a second query, wherein the second query is based on the set of outputs from the language model, wherein the second query is structured according to the format used by the database.

Certain embodiments disclosed herein include a method, non-transitory computer-readable medium, or system as noted above or below, further including or being configured to perform the following step or steps: providing at least one function to the language model, wherein the at least one function is configured to access the database when called by the language model, wherein the set of outputs from the language model includes at least one call to the at least one function.

Certain embodiments disclosed herein include a method, non-transitory computer-readable medium, or system as noted above or below, wherein the request is from a first entity of a plurality of entities, wherein the database includes a plurality of subsets, wherein each subset of the database corresponds to a respective entity of the plurality of entities, wherein the at least one function is configured to limit access by the language model to only at least one subset of the plurality of subsets corresponding to the first entity.

Certain embodiments disclosed herein include a method, non-transitory computer-readable medium, or system as noted above or below, wherein the request is from a first entity of a plurality of entities, wherein the database includes a plurality of subsets, wherein each subset of the database corresponds to a respective entity of the plurality of entities, further including or being configured to perform the following step or steps: identifying at least one first subset among the plurality of subsets which corresponds to the first entity, wherein only the at least one first subset of the database is queried using the second query.

Certain embodiments disclosed herein include a method, non-transitory computer-readable medium, or system as noted above or below, wherein the request indicates at least one attribute of a plurality of attributes in natural language, further including or being configured to perform the following step or steps: defining an event with respect to the at least one attribute; analyzing media content in order to detect the event in at least one portion of the media content; and causing streaming of the at least one portion of the media content when the event is detected.

Certain embodiments disclosed herein include a method, non-transitory computer-readable medium, or system as noted above or below, wherein the request is received via a first language model session with a first language model, wherein the language model to which the first query is provided is a second language model, wherein the first query is provided to the second language model during a second language model session.

Certain embodiments disclosed herein include a method, non-transitory computer-readable medium, or system as noted above or below, wherein the database stores attribute data indicating a plurality of attributes identified within a plurality of media content items, wherein results of querying the database using the second query include at least one instance of at least one attribute among the plurality of attributes, further including or being configured to perform the following step or steps: identifying at least one media content item among the plurality of media content items as including the at least one attribute based on the results of querying the database using the second query.

Certain embodiments disclosed herein include a method, non-transitory computer-readable medium, or system as noted above or below, wherein the at least a portion of the database is queried by a first system, wherein the plurality of media content items is stored in a plurality of storages accessible to a plurality of second systems, further including or being configured to perform the following step or steps: causing transmission of at least a portion of the identified at least one media content item from the plurality of second systems to a third system, wherein causing the transmission of the at least a portion of the identified at least one media content item further includes sending a corresponding identifier for each of the at least one media content item to a respective second system of the plurality of second systems which is configured to access a respective storage among the plurality of storages in which the media content item is stored.

Certain embodiments disclosed herein include a method, non-transitory computer-readable medium, or system as noted above or below, wherein the first system is a cloud server, wherein each of the at least one second system is an edge system, wherein the first system is remote from each of the plurality of second systems.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
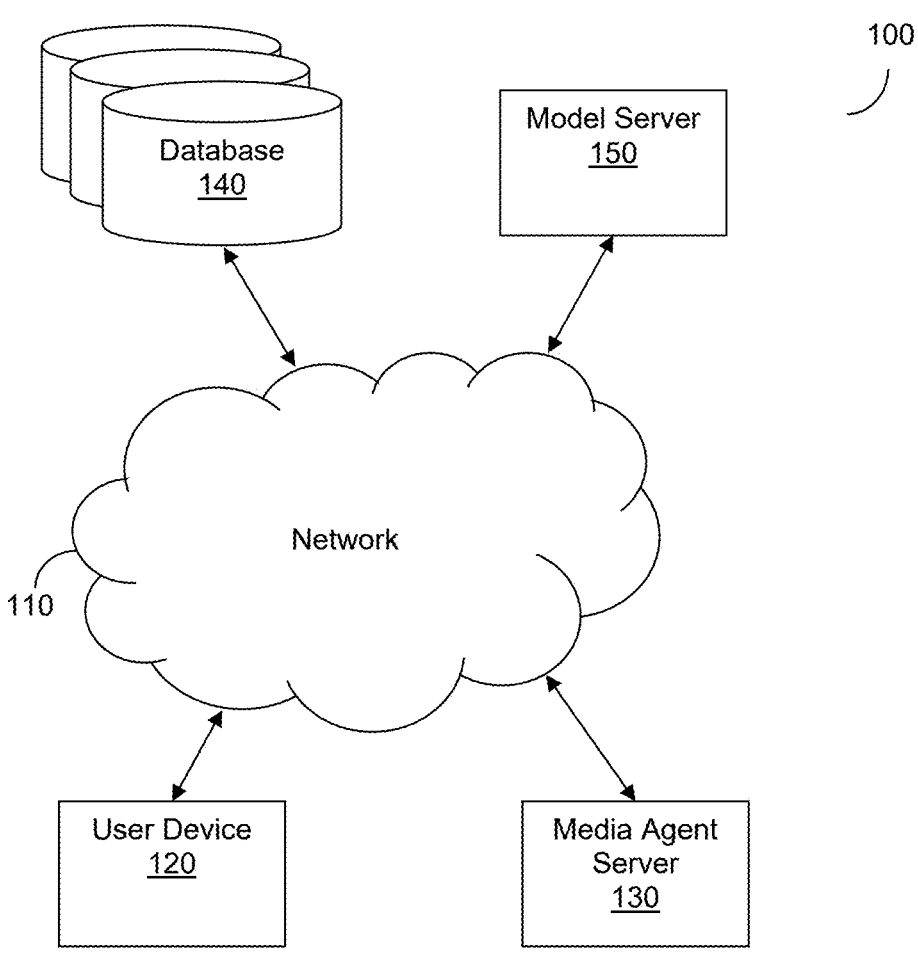
FIG. 1 is a network diagram utilized to describe various disclosed embodiments.

The various disclosed embodiments include techniques for querying language models with respect to multimedia content in order to respond to natural language requests. The disclosed embodiments include methods and systems for responding to natural language queries related to multimedia content which utilize various techniques to analyze multimedia content and generate natural language responses (e.g., text or audio content reflecting natural language words) describing answers to questions or other statements based on the multimedia content, or otherwise to identify multimedia content which may be relevant to the requests.

The multimedia content may include, but is not limited to, visual content (e.g., a video including both visual and audio content). More specifically, various disclosed embodiments utilize a language model such as, but not limited to, a large language model, in order to generate textual content to be utilized for creating response data (e.g., response data including the textual content, audio data generated based on the textual content, and the like).

In an embodiment, query structure examples are stored in a query structure examples database for subsequent use. Each query structure example may include, but is not limited to, an example of natural language text of a request and a structured response to the example natural language text. The query structure examples may be used along with newly received requests including natural language text to generate queries for a language model which enable the language model to generate outputs which are responsive to the newly received requests with respect to multimedia content having certain attributes.

More specifically, in a further embodiment, the query is generated in order to provide the language model with access to one or more tools which may be utilized to search a multimedia content attributes database in order to determine information related to the multimedia content which may be responsive to the request. The multimedia content attributes database stores sets of attribute data corresponding to respective portions of multimedia content. The attribute data, in turn, includes metadata or other data indicating aspects of events or objects demonstrated in the portions of the multimedia content. Accordingly, the language model may be provided access to one or more tools defined with respect to the attributes database in order to enable the language model to access the attributes database via the queries. Thus, the language model may be queried in order to prompt the language model to determine answers to questions represented in the requests. Optionally, portions of the multimedia content which are responsive to the request may be caused to be streamed, for example to a user device or other device which sent the request.

In an embodiment, embeddings may be generated based on the query structure examples. More specifically, a portion of each query structure example including the example natural language text of the request of the query structure example is embedded into an embedding. When a new request including natural language text is received, the new request may be embedded, and the embedding of the new request may be compared to the embeddings generated based on the query structure examples in order to identify one or more matching query structure examples. In such an embodiment, the query to the language model includes the matching query structure examples, thereby improving the accuracy of the resulting language model outputs.

In this regard, the disclosed embodiments may be utilized to respond to natural language requests for multimedia content, for example via a chat agent. As a non-limiting example, natural language text included in a request may be "Can you find a person wearing a yellow shirt?" In accordance with various disclosed embodiments, multimedia content showing (I) a person, (II) wearing a shirt, and (III) where the shirt is yellow may be identified based on the attribute data received from the edge nodes, and one or more edge nodes for streaming the multimedia content may be identified. As another non-limiting example, another natural language text included in a request may be "How many people were seen in video recordings for camera #1234 between 12 PM and 3 PM?" In accordance with various disclosed embodiments, multimedia content meeting criteria of showing people which were captured by a camera with a serial number or other identifier of "1234" during the 12 PM to 3 PM time period may be identified, and a natural language text response indicating a count of how many people were identified within multimedia content meeting the criteria may be returned.

Various disclosed embodiments may leverage attributes detected using machine learning techniques. To this end, at least some disclosed embodiments include detecting certain attributes in the multimedia content. In a further embodiment, the attributes are detected by applying one or more attribute detection machine learning model trained to detect objects demonstrating instances of the attributes in multimedia content. Such an attribute detection machine learning model may be a classifier trained to output one or more classifications for input multimedia content which is input to the attribute detection machine learning model. The resulting attributes output by such a classifier for a given portion of multimedia content may be stored as the corresponding attribute data for the portion of multimedia content.

In yet a further embodiment, the attribute detection machine learning models are trained using at least some synthesized visual content generated with respect to predefined types of attributes. The synthesized visual content may be generated by removing portions of sample visual content showing objects demonstrating certain attributes, and replacing the removed portions with new portions of visual content demonstrating different attributes. As a non-limiting example, a portion of synthesized video may be created by removing an instance of a purple shirt from a video and replacing the removed purple shirt with a red shirt. To this end, in a further embodiment, synthesizing the visual content further includes analyzing the sample visual content via segmentation in order to identify sets of pixels in each sample representing the relevant objects. The identified sets of pixels may be removed, thereby resulting in removed portion visual content items. The new portions of visual content may be generated by querying a machine learning model such as a diffusion model with a text query prompting the model to replace the removed portion with an object having a target attribute.

Some further embodiments may also and outputs in multimedia content and outputs bounding boxes or other visual content indicating locations of the detected objects within the multimedia content. Such bounding boxes or other visual content may be utilized to mark the multimedia content, for example in order to visually distinguish objects within the multimedia content being streamed to user devices. To this end, the edge nodes may be configured to detect objects and to generate modified multimedia content including visual content as markers which visually distinguish the detected objects.

Example processes for detecting objects and for generating bounding boxes or other distinguishing visual content are discussed further in U.S. patent application Ser. No. 18/539,897, assigned to the common assignee, the contents of which are hereby incorporated by reference.

Various embodiments disclosed herein may utilize a distributed multimedia content management system such as, but not limited to, a distributed video management system (VMS). The distributed multimedia content management system utilizes a distributed computing architecture in which a portion of multimedia content management activities occur via multiple edge nodes, and another portion of multimedia content management activities occur via one or more cloud nodes (such as cloud servers).

In an embodiment, multimedia content is recorded or collected via the edge nodes. Each edge node may store the multimedia content locally, and may provide the multimedia content (e.g., stream video content) to a user device based on requests for streaming received via the cloud nodes. In a further embodiment, each edge device may generate attribute data and send the attribute data to one or more of the cloud nodes. For example, each edge node may be configured to perform attribute detection as discussed herein and to generate attribute data based on detected attributes. The attribute data generated by a given edge node may be, but is not limited to, metadata or other data indicating attributes about the multimedia content stored locally by the edge node. The cloud nodes, in turn, may utilize the metadata in order to identify potentially relevant content for responses. The metadata may include textual data having text indicating one or more attributes of the multimedia content. To this end, each edge device may analyze the multimedia content stored by the edge device locally in order to identify such attributes.

Embodiments which utilize a distributed architecture as discussed herein offer several technical advantages in terms of computer performance with respect to use of distributed computing techniques. More specifically, recording and storing multimedia content locally on edge and only transmitting attribute data allows for conserving computing resources related to network transmissions to cloud nodes as well as storage and processing of multimedia content on the cloud nodes.

Moreover, cloud nodes which respond to natural language requests may analyze the attribute data more efficiently than the multimedia content, thereby allowing for conserving processing power needed to identify multimedia content which is responsive to the request. Even further, using attribute data for querying language models allows for leveraging language models which may not support multimedia content analysis. That is, language models which are only configured to process and generate text may be queried.

Further, at least some disclosed embodiments which utilize a distributed architecture as discussed herein may be realized without exposing the multimedia content directly to the cloud node or to the language model. That is, multimedia content may be stored locally by edge nodes and streamed directly (e.g., to a user device) without needing to transmit, stream, or otherwise provide access to the multimedia content to any cloud nodes or language models. This may allow for securely storing the multimedia content, for example in computing environments owned or operated by an entity which records the multimedia content, without exposing the multimedia content to a third party service provider which provides the cloud node processes using attribute data as discussed herein.

FIG. 1 shows an example network diagram 100 utilized to describe the various disclosed embodiments. In the example network diagram 100, a user device 120, a media agent server 130, a plurality of databases 140-1 through 140-N (hereinafter referred to individually as a database 140 and collectively as databases 140, merely for simplicity purposes), and a model server 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device 120 is configured to receive user inputs related to media content and to play or otherwise project media content, for example, media content streamed from the media agent server 130. The user device 120 may be configured to send queries, for example in the form of natural language text, to the media agent server 130 for use in identifying relevant media content based on embeddings as discussed herein. The user device 120 may be, but is not limited to, a personal computer, a laptop, a tablet computer, a smartphone, a wearable computing device, or any other device capable of receiving and displaying notifications.

The media agent server 130 includes a memory and a storage (memory and storage not depicted in FIG. 1). In accordance with various disclosed embodiments, the multimedia agent server 130 is configured to perform activities related to searching for attributes with respect to metadata. For example, embeddings representing visual data stored at the edge may be stored and accessed by the media agent server 130 in order to identify applicable portions of media content based on incoming requests. The embeddings may be stored in the storage, for example, in one or more media content embedding databases (not shown).

In this regard, the metadata may include or otherwise represent attribute data about the underlying media content (for example, whether a given portion of media content illustrates a certain attribute) in a reduced representation portion of data as compared to the entire media content. This reduced representation may be searched via the media agent server 130 when requests are received more efficiently than searching the underlying media content each time a request is received.

In some embodiments, in order to make media content conveniently more accessible to end users, the media agent server 130 may further support receiving requests including natural language text. To this end, in such embodiments, the media agent server 130 may be configured to refine outputs of a language model, for example, by providing queries with examples of natural language text and corresponding examples of structured queries representing the same underlying aspects of media content as the natural language text examples. When queries including natural language text are subsequently received at the media agent server 130, the media agent server 130 may query the language model with the natural language text of those queries in order to obtain structured queries which may be utilized to query the embeddings stored in the storage. That is, the media agent server 130 may query the language model using a first natural language query, and the language model may output text including a second structured query which is structured according to a format used by, for example, a media content database.

The media agent server 130 may further maintain a set of query structure examples demonstrating example queries which comply with a structure used by the query embedding databases stored in the storage. Accordingly, the storage may further include a query structure examples database including these query structure examples. As discussed herein, the example query structures may be used to refine outputs of a model (for example, a language model accessed by the model server 150) such that structured outputs of the model are refined to comply with a structure recognized by the media content embedding database.

In accordance with various disclosed embodiments, the media agent server 130 may also be configured to store and process media content such as videos. The media agent server 130 may be configured to record or otherwise receive recordings of such media content, and to generate embeddings representing aspects of the media content. The embeddings of media content may be stored by the media agent server 130 in order to allow the media agent server 130 to store and process those embeddings without requiring the underlying media content.

When the media agent server 130 identifies media content which is responsive to a query with respect to embeddings of the media content, the media agent server 130 may stream or otherwise transmit the media content corresponding to those embeddings, for example, to the user device 120.

The model server 150 is configured to query a language model (not shown) such as, but not limited to, a large language model (LLM). The model server 150 may receive queries (for example, from the media agent server 130) and return outputs of the model. In accordance with various disclosed embodiments, the model server 150 may receive queries in the form of natural language text and may return text of structured queries corresponding to a structure used by one or more media content embedding databases (for example, databases stored in the storge). Accordingly, in such embodiments, the model server 150 and models accessed by the model server 150 may be utilized to translate natural language text queries into structured queries which may be utilized to search through media content embeddings.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
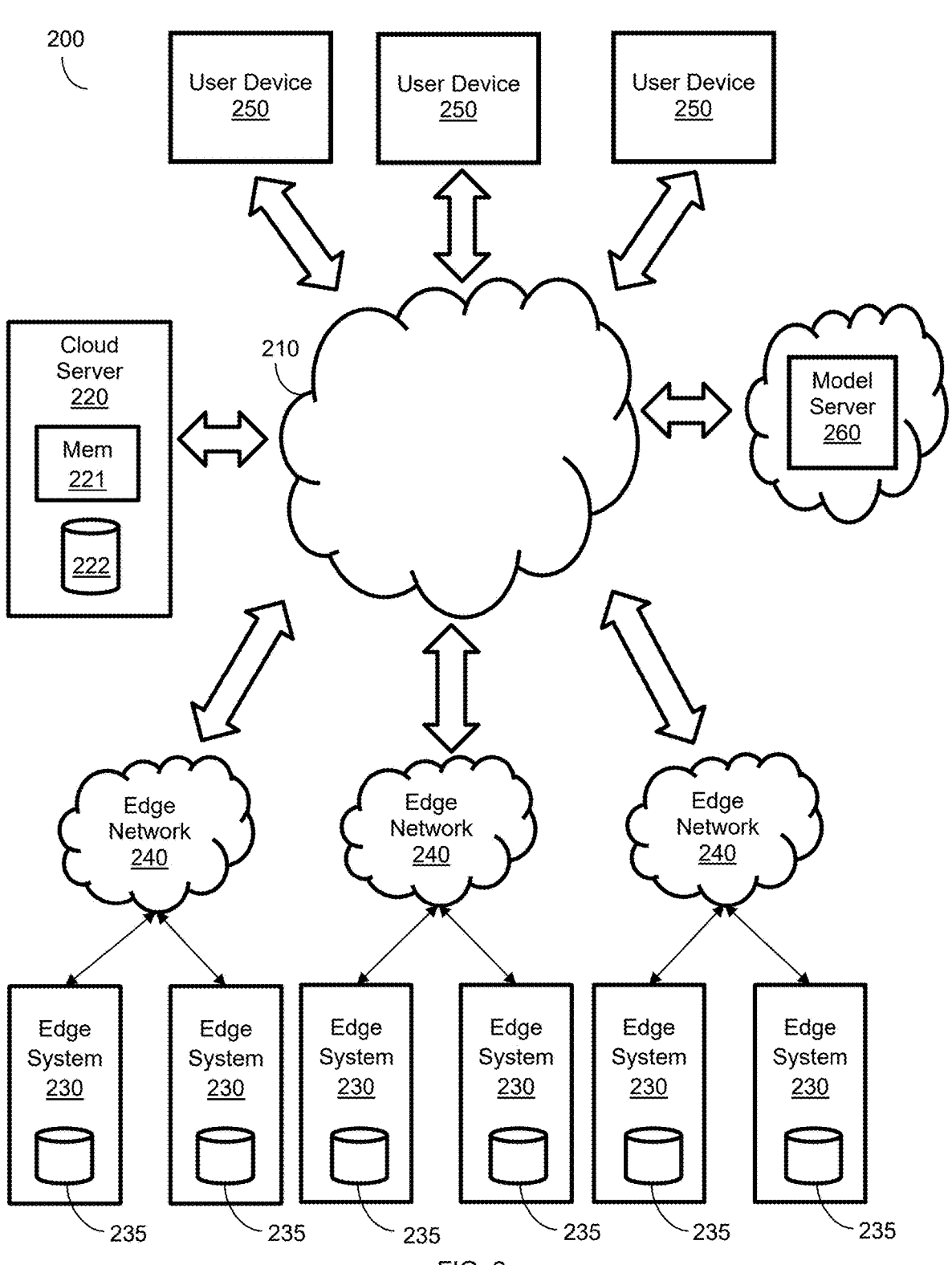
FIG. 2 is a network diagram utilized to describe various disclosed embodiments realized using a distributed architecture.

FIG. 2 shows an example network diagram 200 utilized to describe the various disclosed embodiments realized using a distributed architecture. In the example network diagram 200, a cloud server 220, edge systems 230, user devices 250, and a model server 260 communicate at least via a network 210. The network 210 may be, but is not limited to, a wireless, cellular or wired network, a local area network (LAN), a wide area network (WAN), a metro area network (MAN), the Internet, the worldwide web (WWW), similar networks, and any combination thereof.

The cloud server 220 includes a memory (mem) 221 and a storage 222. In accordance with various disclosed embodiments, the cloud server 220 is configured to perform a portion of distributed computing activities with the edge systems 230. More specifically, the cloud server 220 may be configured to perform portions of the distributed computing activities related to metadata. For example, embeddings representing visual data stored at the edge may be stored and accessed by the cloud server 220 in order to identify applicable portions of media content based on incoming requests. The embeddings may be stored in the storage 222, for example, in one or more media content embedding databases (not shown).

In this regard, the cloud server 220 and the edge systems 230 may collectively act as a distributed architecture used to realize a distributed video management system (VMS). Such a distributed VMS may distribute certain video or other media content management activities between the cloud server 220 and the edge systems 230, for example, by having the edge systems 230 store and process media content while the cloud server 220 performs activities using metadata. To this end, the edge systems 230 may be configured to analyze media content (for example, to detect objects or other attributes) and to generate data including such metadata for transmission to the cloud server 220 for use in responding to requests. The media content may be compressed at the edge systems 230 or otherwise be collected by the edge systems 230 in a compressed format in order to reduce the amount of data stored by the edge systems 230.

As discussed herein, the distribution of activities may allow for efficiently and securely processing media content such as videos. Additionally, the distributed VMS may be utilized to effectively enable querying for video content in natural language by leveraging language models in order to translate a first natural language query into a second structured query as discussed herein.

In this regard, the metadata may include or otherwise represent attribute data about the underlying media content (for example, whether a given portion of media content illustrates a certain attribute) in a reduced representation portion of data as compared to the entire media content. This reduced representation may be both transmitted to the cloud server 220 and searched via the cloud server 220 more efficiently than transmitting and searching the underlying media content each time a request is received.

In some embodiments, in order to make media content conveniently more accessible to end users, the cloud server 220 may further support receiving requests including natural language text. To this end, in such embodiments, the cloud server 220 may be configured to refine outputs of a language model, for example, by providing queries with examples of natural language text and corresponding examples of structured queries representing the same underlying aspects of media content as the natural language text examples. When queries including natural language text are subsequently received at the cloud server 220, the cloud server 220 may query the language model with the natural language text of those queries in order to obtain structured queries which may be utilized to query the embeddings stored in the storage 222. That is, the cloud server 220 may query the language model using a first natural language query, and the language model may output text including a second structured query which is structured according to a format used by, for example, a media content database.

The cloud server 220 may further maintain a set of query structure examples demonstrating example queries which comply with a structure used by the query embedding databases stored in the storage 222. Accordingly, the storage 222 may further include a query structure examples database including these query structure examples. As discussed herein, the example query structures may be used to refine outputs of a model (for example, a language model accessed by the model server 260) such that structured outputs of the model are refined to comply with a structure recognized by the media content embedding database.

The edge systems 230 are configured to perform a portion of the distributed computing activities with the cloud server 220. More specifically, in accordance with various disclosed embodiments, the edge systems 230 may be configured to store and process media content such as videos. The edge systems 230 may be configured to record or otherwise receive recordings of such media content, and to generate embeddings representing aspects of the media content. To this end, each edge system 230 may include a data storage 235 to be used for storing media content. The embeddings of media content may be sent from the edge systems 230 to the cloud server 220 in order to allow the cloud server 220 to store and process those embeddings without requiring the underlying media content.

In accordance with various disclosed embodiments, media content may be recorded or otherwise collected at the edge systems 230, and the edge systems 230 may send metadata of the media content to the cloud server 220. That is, in various embodiments, video data or other visual data may be stored only at the edge (i.e., by the edge systems 230, for example in the edge systems 230 or in local storages accessible to the edge systems 230) and only a limited set of data (for example, metadata or other data which has a lower total amount of data than the underlying media content) is transmitted to the cloud. This limited transmission of data to the cloud server 220 allows for reducing computing resources used for data transmission and network communications, and may accelerate the speed of processing by avoiding requiring sending media content to the cloud server 220 for centralized processing.

The cloud server 220 may receive requests for content, for example from the user devices 250, and the cloud server 220 may distribute these requests to the edge systems 230, for example by identifying an appropriate edge system 230 to service the request using queries created based on natural language text included in the requests as described herein. For example, the cloud server 220 may distribute a query for a given portion of media content to the edge system 230 which is able to access the media content. In some embodiments, the edge system 230 may stream that media content directly to one of the user devices 250 which sent the request.

When the cloud server 220 identifies media content which is responsive to a query, the cloud server 220 may send identifiers of the embeddings of that media content to one or more of the edge systems 230, and the edge systems 230 may stream or otherwise transmit the media content of those embeddings (for example, to one or more of the user devices 250).

To facilitate communications with the network 210, the edge systems 230 may each communicate via an edge network 240. Each edge network 240 may be, but is not limited to, a wireless, cellular or wired network, a local area network (LAN), a wide area network (WAN), a metro area network (MAN), the Internet, the worldwide web (WWW), similar networks, and any combination thereof.

The user devices 250 are configured to receive user inputs related to media content and to play or otherwise project media content, for example, media content streamed from one of the edge devices 230. The user devices 250 may be configured to send queries, for example in the form of natural language text, to the cloud server 220 for use in identifying relevant media content based on embeddings as discussed herein. Each user device 250 may be, but is not limited to, a personal computer, a laptop, a tablet computer, a smartphone, a wearable computing device, or any other device capable of receiving and displaying notifications.

The model server 260 is configured to query a language model (not shown) such as, but not limited to, a large language model (LLM). The model server 260 may receive queries (for example, from the cloud server 220) and return outputs of the model. In accordance with various disclosed embodiments, the model server 260 may receive queries in the form of natural language text and may return text of structured queries corresponding to a structure used by one or more media content embedding databases (for example, databases stored in the storage 222). Accordingly, in such embodiments, the model server 260 and models accessed by the model server 260 may be utilized to translate natural language text queries into structured queries which may be utilized to search through media content embeddings.

It should be noted that FIG. 2 depicts an implementation of various disclosed embodiments, but that at least some disclosed embodiments are not necessarily limited as such. Other deployments, arrangements, combinations, and the like, may be equally utilized without departing from the scope of the disclosure. In particular, a single cloud server 220 is depicted in FIG. 2 for simplicity purposes, but additional cloud servers may be equally utilized without departing from the scope of the disclosure.

Additionally, the cloud server 220 is depicted as being separate from the model server 260 for example purposes, but in at least some embodiments, the cloud server 220 may also be configured to query a model or otherwise perform activities performed by the model server 260. To that end, the model may be stored in the storage 222 or otherwise accessible to the cloud server 220 such that the cloud server 220 may directly query the model rather than through the model server 260 in such implementations.

Figure 3:
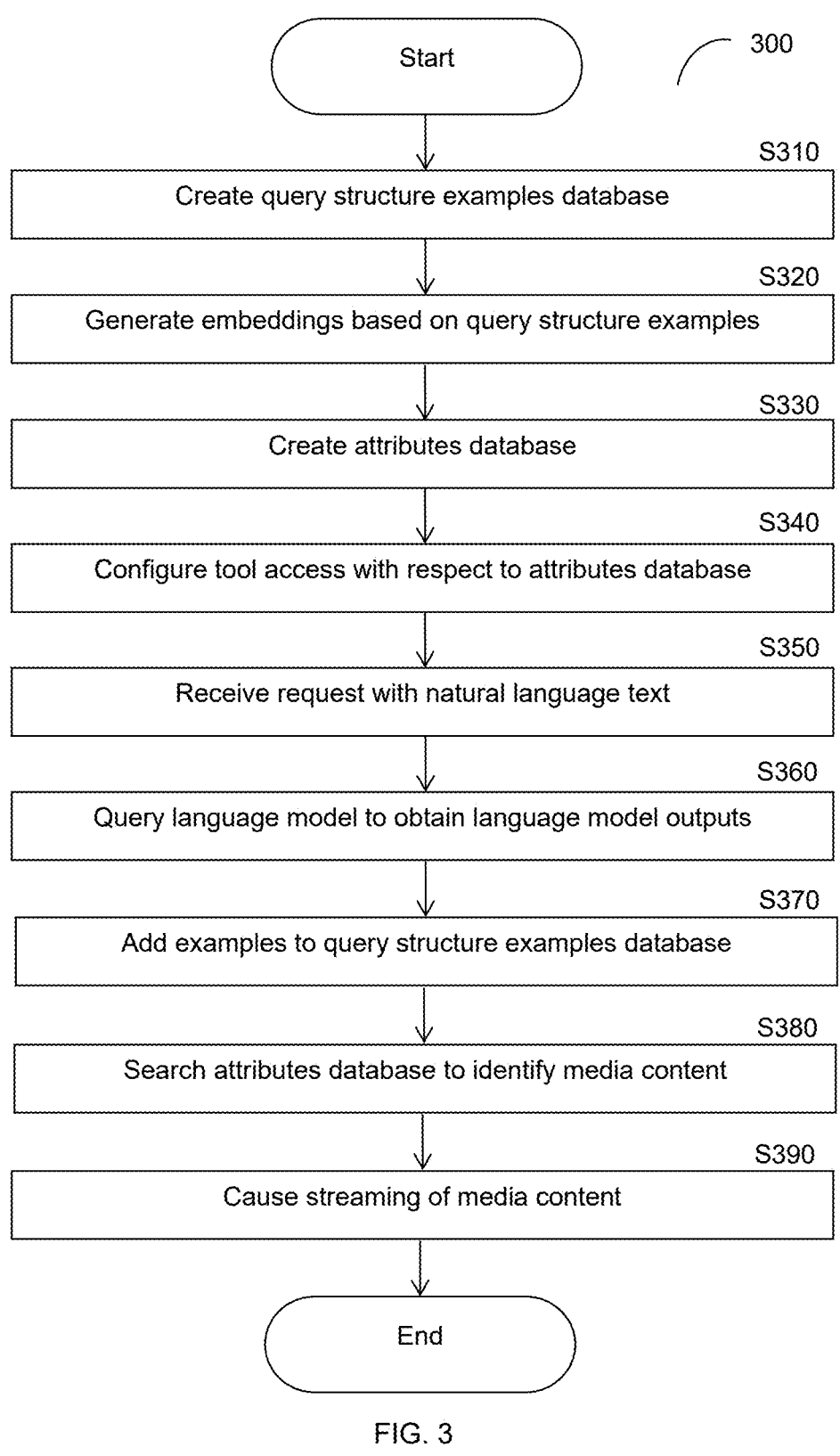
FIG. 3 is a flowchart illustrating a method for responding to natural language queries with respect to multimedia content according to an embodiment.

FIG. 3 is a flowchart 300 illustrating a method for responding to natural language queries with respect to multimedia content according to an embodiment. In an embodiment, the method is performed by the multimedia agent server 130, FIG. 1, or the cloud server 220, FIG. 2.

At S310, a query structure examples database is created. In an embodiment, the query structure examples database includes example query structures which may be loaded to a language model in order to refine outputs of the language model such that structured outputs of the model are refined to comply with a structure recognized by the media content embedding database as discussed herein. As a non-limiting example, a set of 3-5 query structure examples may be dynamically loaded to a LLM and used by the LLM to determine an appropriate structure for outputs to be used as structured queries to a media content database.

The query structure examples include data structures formatted according to a data communication or storage format such as, but not limited to, JavaScript Object Notation (JSON) format. Such data structures include fields to store corresponding values, where a language model may be utilized to determine values for the corresponding fields in order to provide outputs which comply with the data structures represented by the example query structures. This, in turn, allows the language model to translate a query for a media content database received in natural language (for example, as text created based on user inputs) into a structured query in a format recognized by the media content database. That is, this translation effectively allows a user to query a media content database in natural language, for example, in order to retrieve a video showing certain attributes or in order to receive outputs indicating information about video content.

In an embodiment, each query structure example includes both a natural language text example of a question as well as a structured answer to that question (for example, an answer realized as structured text which is structured according to a format used by a database storing media content for media content search or retrieval).

At S320, embeddings are generated based on the example query structures such as, but not limited to, the example query structures stored in the query structure examples database. Each embedding is a reduced representation of at least a portion of one of the example query structures which may be utilized for efficient comparisons. The embeddings may be, for example but not limited to, semantic embeddings created using a semantic embedding process. Such a semantic embedding process may utilize predetermined word embeddings in order to replace original words in text with the closest neighbors to those original words in embedding space, thereby enhancing the representation of semantic meaning in the resulting embedding.

As a non-limiting example, when a query is received containing text in natural language, the text may be embedded using a semantic embedding process and compared to embeddings of query structure examples which were created by embedding portions of query structure examples (for example, by embedding text among the query structure examples) using the semantic embedding process. Thus, embedding the query structure examples facilitates such comparisons.

At S330, an attributes database is created. The attributes database includes data indicating attributes associated with respective media content items or other portions of media content. To this end, the attributes database may include fields containing values representing attributes as well as fields containing values representing media content items or portions of media content having certain attributes.

The values representing media content items or other portions of media content may be strings or other values representing identifiers of certain media content items or other portions of media content which uniquely identify their corresponding portions of media content. That is, a value representing a given portion of media content may be an identifier of that portion of media content which uniquely identifies that portion of media content such that the unique identifier is not associated with or otherwise does not identify any other portion of media content represented in the attributes database. The identifier for each portion of media content may be or may include, an identifier of the media content portion itself, an identifier of a location in storage of the media content portion (for example, a storage location in a storage accessible to an edge device belonging to an entity of the media content), both, and the like. To this end, in embodiments where the media content portion is identified at least partially using an identifier of a storage location of the media content portion, the attribute data may further indicate an edge device or other system which is capable of accessing that storage location which may be utilized to determine which edge device or other system should be used for streaming the media content as discussed further below.

The fields containing attribute values may be organized so that they occupy a portion of the same data structures or substructures to which the corresponding media content identifier values belong. As a non-limiting example, attribute fields may occupy the same columns, rows, or tables as their corresponding media content identifier fields. This organization of attribute fields within the same data structures or substructures as the corresponding media content identifier fields may be utilized to efficiently identify certain media content identifier fields as corresponding to attributes found during searches responsive to requests as discussed herein.

In an embodiment, the attributes database has different subsets corresponding to different entities. To this end, data within the attributes database may include fields containing metadata that indicate the entity for a given subset of data within the attributes database. Such metadata may therefore define different subsets. In a further embodiment, the subsets of the attributes database may be defined more granularly, for example, by defining a given subset of the attributes database as belonging to a particular sub-entity of a given entity. Such additional granularity may allow for further restricting database access, as a non-limiting example, by allowing users of a parent entity to access attribute data of a child entity but not allowing users of the child entity to access attribute data of the parent entity which is not also assigned to the child entity.

As discussed herein, the attribute data may be used to cause streaming of certain portions of media content. Accordingly, assigning certain subsets of the attribute data to certain entities (for example, via metadata indicating to which entity, sub-entity, or both, a given subset of data belongs) allows for securing the underlying media content by providing another layer of protection against accidental improper access of the media content by unauthorized entities or sub-entities.

At optional S340, one or more tools may be configured in order to provide the tools with access to an attributes database. In an embodiment, each tool is configured with data about the attributes database such as, but not limited to, a location of the attributes database, credentials required to access the attributes database, tenants, or other entities with which different subsets of the attributes database are associated, and the like. Each tool may be, but is not limited to, a function, service, or other set of code configured to access databases.

In a further embodiment, each tool is configured to access only the attributes database, for example, as contrasted with being configured to access other attributes databases or other databases generally. As discussed herein, limiting access to only certain databases may aid in securing data being accessed to respond to requests by preventing accidental data leakage related to retrieving data from one database that belongs to a different entity than the entity which requested data. To this end, in such an embodiment, the tool may be configured only with, as a non-limiting example, the location and access credentials of one or more attributes databases belonging to a given entity. When the tool is configured only with the location and access credentials of certain attributes databases, the tool may only be capable of accessing those attributes databases, thereby preventing the tool from being used to improperly access data (for example, data belonging to other entities).

In another embodiment, each tool may be configured to access only a subset of the attributes database. For example, different subsets of the attributes database may be accessed using respective credentials, and a given tool may be configured only with credentials for certain subsets of the attributes database but not all subsets of the attributes database.

At S350, a request including natural language text is received. As a non-limiting example, the request may be or may include text from a chatbot session with a user of a user device (for example, the user device 120, FIG. 1, or one of the user devices 250, FIG. 2). The request therefore acts as a query in natural language text to be processed in order to query a media content database, for example, using a translated version of the natural language text which has been translated into a structured query according to a format used by the media content database. To this end, the request may be realized via a first language model session using a first language model acting as a chatbot.

At S360, a language model is queried in order to obtain a set of language model outputs. In an embodiment, the language model outputs a set of language model outputs including text. In a further embodiment, at least a portion of the text of the language model outputs comply with a format used by a media content embeddings database such that the portion of text may be utilized as a structured query to such a database. The language model may be, but is not limited to, a large language model (LLM).

When the request is realized via a first language model session using a first language model acting as a chatbot, the language model queried at S360 may be a second language model and may act as an interactive query generator to create a structured query during a second language model session. In accordance with various disclosed embodiments, these first and second sessions may be separate sessions which each lacks data from the other session. Additionally, the first and second language models may be, but are not necessarily, different language models (for example, different language models entirely or different instances of the same underlying language model). Using separate models for the chat session with a user in order to obtain the requests in natural language and for the generation of structured queries as described herein may further aid in securing data, for example, by preventing improper access of data by users interacting with the chatbot. Data that is relevant to one session may be provided based on the other session, for example, by providing the natural language request from the first session as inputs for the second session.

An example process for querying a language model which may be utilized at S260 is described further below with respect to FIG. 4.

At optional S370, an example is added to a query structure examples database based on the outputs of the language model. The examples may be added to the database in order to improve processing of subsequent requests, for example, by adding examples which may be closer to potential future text of requests. To this end, in an embodiment, S370 includes generating a query structure example based on the request and the outputs of the language model (i.e., the outputs including the structured query).

As noted above, in an embodiment, each query structure example includes both a natural language text example of a question as well as a structured answer to that question (for example, an answer realized as structured text which is structured according to a format used by a database storing media content for media content search or retrieval). To this end, in a further embodiment, the example to be added to the query structure examples database includes text of the request (for example, the natural language text indicating the attributes or other aspects of the media content to be searched for) as well as at least a portion of the outputs of the language model (for example, a portion of the outputs of the language model that is or includes the structured query).

In some embodiments, the example may be added to the query structure examples database based further on user inputs such as, for example, user inputs indicating whether the resulting structured query is an appropriate result for a given natural language text input. To this end, in such an embodiment, S370 may include presenting the resulting structured query output by the language model to a user (for example, by sending such structured query to a user device for display) and receiving user inputs indicating whether the structured query is correct for a given natural language text input. In this regard, the examples in the query structure examples database may be updated over time and validated by users in order to ensure that additional examples improve accuracy of subsequent structured queries being generated.

At S380, an attributes database is searched based on the language model outputs in order to identify media content which is responsive to the request. In an embodiment, searching the attributes database includes executing the structured query among the language model outputs on the attributes database. As noted above, the structured query may comply with a format used by the attributes database as defined via examples provided to the language model. Also noted herein, the language model may be provided access to tools such as functions which allow the language model to access the attributes database via structured queries. To this end, in some embodiments, the language model may call such a function, thereby triggering searching of the attributes database by the system performing the method of FIG. 3.

In an embodiment, results of searching the attributes database at least include an identifier of media content or a location of media content which is responsive to the request. In a further embodiment, results of searching the attributes database further include an identifier or a network location of an edge node (for example, one of the edge systems 230, FIG. 2) which manages the responsive media content and may be used for streaming or transmitting the media content.

At S390, streaming or otherwise transmission of media content is caused. In an embodiment, the media content is streamed from a system which manages the media content (for example, the media agent server 130, FIG. 1, or one of the edge systems 230, FIG. 2) to a device which will play the media content (for example, the user device 120, FIG. 1, or one of the user devices 250, FIG. 2). To this end, in an embodiment, causing streaming or transmission of the media content includes sending a request to a system which manages the media content. Such a request further indicates a location or otherwise indicates the end device (for example, a user device) to which the media content is to be streamed or transmitted (for example, the user device which submitted an initial natural language text request for media content meeting certain criteria defined with respect to attributes).

In a further embodiment, the media content is not transmitted to or through the system performing the method of FIG. 3 (for example, the cloud server 220, FIG. 2). That is, the media content may be streamed directly from an edge system to a user device while avoiding transmitting the media content to a cloud server or other centralized location.

To this end, in some embodiments, streaming the media content includes identifying an edge node (or example, one of the edge systems 230, FIG. 2) to be used for streaming media content based on the language model outputs. In an embodiment, the edge node is an edge node which stores, is configured to access, or is otherwise capable of accessing media content represented in the language model outputs. The edge node may be remote from the system performing the method of FIG. 3. As noted herein, using remote edge nodes to stream the media content directly to the requesting device may allow for avoiding transmitting media content through a central system, thereby avoiding introducing potentially exploitable vulnerabilities for security purposes.

Figure 4:
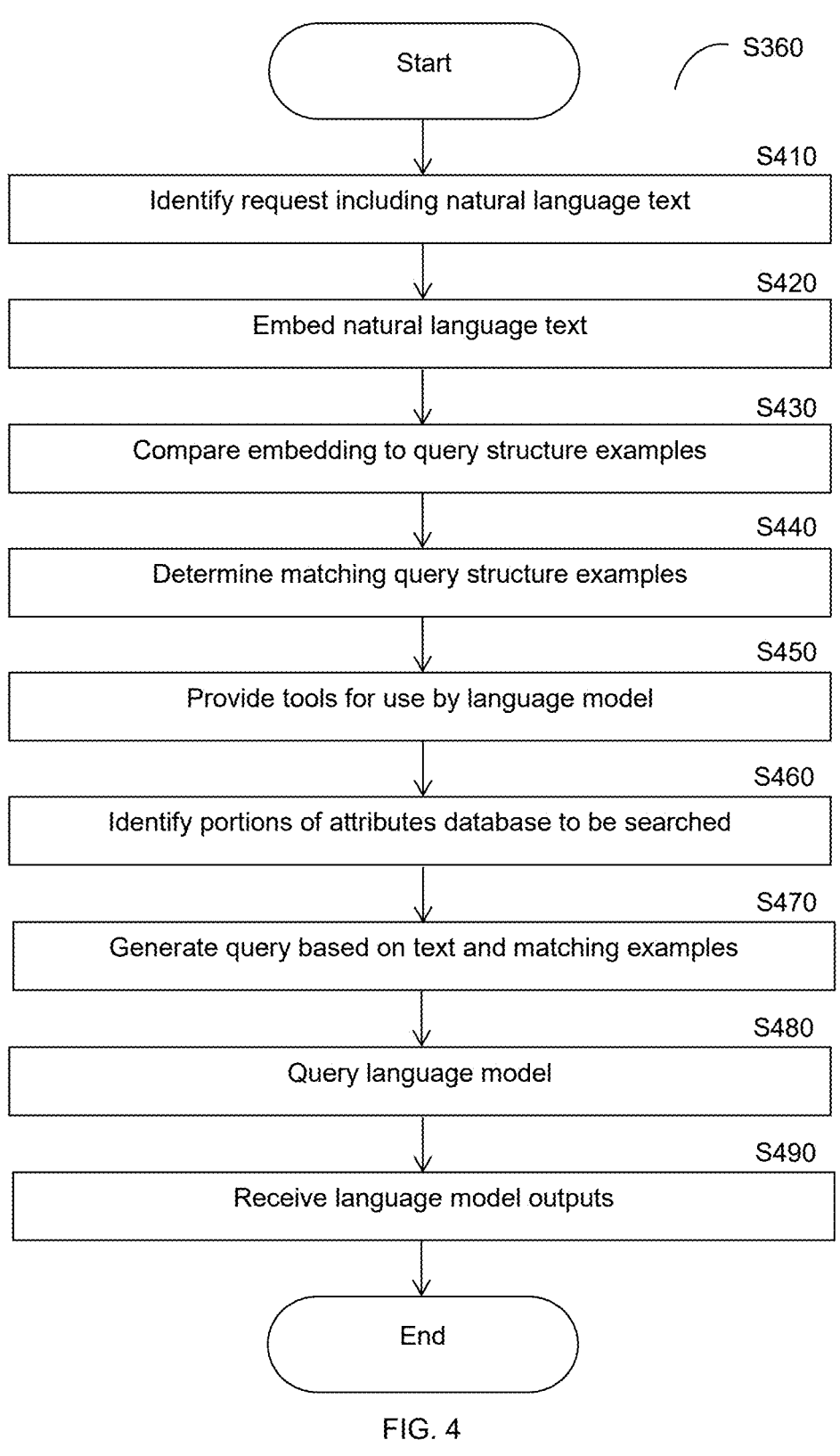
FIG. 4 is a flowchart illustrating a method for querying a language model according to an embodiment.

FIG. 4 is a flowchart S360 illustrating a method for querying a language model according to an embodiment.

At S410, a request including natural language text is identified. The request may be or may include, but is not limited to, text requesting media content (for example, video content) or information about media content.

As a non-limiting example, the request may be or may include the text "Can you find a person wearing a yellow shirt?" As another non-limiting example, the request may be or may include the text "How many people were seen in video between 12 PM and 3 PM?"

In some embodiments, the request may be utilized to define certain events of interest. To this end, the natural language text of the request may indicate attributes used to define certain events such that media content may be subsequently analyzed (for example, as the media content is captured and collected) in order to detect events. In a further embodiment, when an event is detected, media content or a portion of media content illustrating the detected event may be identified via a structured query and streamed as discussed herein.

As a non-limiting example, a request may include the following natural language text: "When a car is parked in spot 5, send me a video clip." Such natural language text therefore defines attributes in the form of an object (car) and a location (spot 5) which may be identified in video content, and defines these attributes as an event to trigger sending a portion of media content (a video clip) showing these attributes. It should be noted that a video clip is a non-limiting example, and that other portions of media content (for example, a thumbnail) may equally be requested.

Because a language model is used to handle these requests in accordance with at least some embodiments, the requests may further be used to obtain information related to the relevant media content. As a non-limiting example, text of the request may include "Send me the license plate number of each car that parks in spot 5." Such text defines an event (car parked in spot 5) and attributes (license plate, car, and spot 5) in addition to asking for information related to each such event (the license plate number of the car). When the language model returns a structured query to be used for finding media content including license plates of cars parked in spot 5, the outputs of the language model may further indicate that portions of media content including license plate attributes are to be streamed or otherwise provided. As a non-limiting example, a video clip with a bounding box around the license plate shown in the video clip may be streamed or provided from an edge system to a user device when an event including a vehicle parked in spot 5 is detected.

At S420, the natural language text of the request is embedded in order to create an embedding. In an embodiment, embedding the natural language text of the request includes applying one or more semantic embedding processes in order to create a semantic embedding. Such a semantic embedding process may utilize predetermined word embeddings in order to replace original words in text with the closest neighbors to those original words in embedding space, thereby enhancing the representation of semantic meaning in the resulting embedding.

At S430, the embedding is compared to a set of query structure examples. More specifically, in an embodiment, the embedding is compared to embeddings of the query structure examples among the set of query structure examples. Each embedding of one of the query structure examples is an embedding of at least a portion of the query structure example such as, but not limited to, text among the query structure example. More specifically, the embedding of each query structure example to which the embedding of the request text is compared may be or may include an embedding of a portion of the respective query structure example corresponding to text of a historical request example (for example, text indicating a historical or otherwise example request for media content or information about media content having certain attributes).

In an embodiment, each query structure example includes an example of natural language text of a request and a structured response to the example natural language text. The query structure examples may be used along with newly received requests including natural language text to generate queries for a language model which enable the language model to generate outputs which are responsive to the newly received requests with respect to media content having certain attributes.

At S440, one or more matching query structure examples are determined based on the comparison. The matching query structure examples may be a predetermined top number of matching query structure examples, a set of query structure examples which match the embedding above a threshold, and the like.

At S450, tools to be used by a language model are identified and provided for use by the language model. The tools may be used by the language model, for example, to process input natural language queries in order to output structured queries as discussed herein. More specifically, the tools may be configured to access one or more databases (for example, an attributes database as described herein) in order to provide data from those databases for use in generating structured queries within natural language text. To this end, the tools may be configured to identify instances of media content having certain attributes.

The language model may determine which function or functions to call based on text included in requests for media content or information about media content represented in the attributes database. To this end, in some embodiments, providing the tools to the language model may further include providing text indicating how each tool is to be used to the language model. Such text may include, but is not limited to, a description of what actions the tool performs, example text of requests for which the tool may be relevant, a description of inputs the tool is configured to accept, examples of inputs, a description of the types of data output by the tool, examples of outputs, combinations thereof, and the like.

In an embodiment, at least one of the tools is a function configured to search the attributes database for instances of media content or portions of media content which have certain attributes. Such a function may be configured to receive input attribute values and search the attributes database in order to output identifiers of media content having those attribute values and, optionally, additional information about the location of the media content, systems which manage or can otherwise access the media content, or both.

In an embodiment, at least one of the tools is a function configured to search the attributes database for instances of attributes in media content in order to return data indicating a number of instances, a frequency, and the like, regarding the attributes as they relate to media content. Such a function may be configured to receive input attribute values and search the attributes database in order to determine a number of instances of media content having those attribute values (for example, a total number or a number within a given time period). To this end, this function is configured to process statistical data about instances of media content found via the attributes database (for example, by performing counting operations with respect to results of searching the attributes database, divisional operations, and the like). This function therefore effectively allows the language model to return outputs indicating such statistical information related to the media content represented in the attributes database.

In some embodiments, access to the attributes database may be restricted, for example to tenants which own or operate certain edge nodes. To this end, in such a further embodiment, the tools used to access the media content attributes database are configured for database access such that the tools may only be used to access attribute data in the media content attributes database which belongs to a given entity (for example an entity which owns or operates the edge node which collected the portions of media content corresponding to attribute data to be accessed via the tools). Tools which allow for such access restrictions by default may be utilized in such embodiments, or otherwise the tools may be reconfigured or otherwise configured to place access restrictions.

At optional S460, one or more relevant subsets of an attributes database to be searched for potential attribute matches are identified. In an embodiment, the attributes database may be organized per entity (for example, having certain subsets dedicated to storing attribute data for media content owned or otherwise managed by certain tenants) such that, for a given request (for example, for a request from a certain user device) only those relevant subsets of the attributes database are searched.

As noted above, in some embodiments, the tools to be used by the language model may be configured only to access certain attributes databases, and different attributes databases may be owned or otherwise assigned to respective entities. In such embodiments, the relevant subsets of a given attributes database may include the entire attributes databases. Alternatively, relevant subsets of an attributes database may be determined for an attributes database belonging to an appropriate entity based on, for example, timeframe (for example, based on a timeframe indicated in a request, only attributes for media content captured or otherwise collected during the timeframe may be considered relevant). Limiting access to only certain subsets of an attributes database may therefore aid in securing subsets of the attributes database belonging to different entities, which in turn may also reduce the chance of mistakenly streaming media content to unauthorized devices.

Limiting access to certain attributes databases or subsets of attributes databases may also reduce the amount of searching needed to be performed since, in at least some embodiments, only media content belonging to a given entity (for example, a given tenant) may be accessed by user devices associated with that entity such that other media content (for example, media content belonging to other tenants) are not relevant potential search results for searched related to that entity. Additionally, only searching for attributes related to certain entities allows for improving security and avoiding instances where the underlying media content for one entity is found during a search and improperly provided to or otherwise accessed by another entity.

At S470, a query is generated based on the text of the request and the matching query structure examples. In an embodiment, the query includes the text of the request and the matching query structure examples such that the matching query structure examples may be utilized by the language model in order to translate the text from natural language to a structured query language such as, but not limited to, JSON.

More specifically, in a further embodiment, the query is generated in order to provide the language model with access to one or more tools which may be utilized to search a media content attributes database in order to determine information related to the media content which may be responsive to the request. The media content attributes database stores sets of attribute data corresponding to respective portions of media content (for example, respective media content items or portions of media content items).

In an embodiment, queries generated at S470 only include data for a given tenant or other entity. That is, the query may be generated so that the query only includes data related to a tenant or entity associated with the device requesting media content or information about media content (for example, an entity associated with the user device 120, FIG. 1, or one of the user devices 250, FIG. 2, which sent a natural language request). Including only data for a given entity in the query to the language model helps provide per-tenant filtering At S480, a language model is queried using the generated query. The language model may be, but is not limited to, a large language model (LLM). In some embodiments, the language model is accessible via a server or other system. To this end, in such embodiments, querying the language model includes transmitting the query to such a server or other system.

At S490, outputs of the language model are received. In accordance with various disclosed embodiments, the outputs of the language model include text containing a query in a structured format used by a media content database which may therefore be utilized to query the media content database for data related to the media content such as, but not limited to, attribute data stored as metadata in association with different portions of media content.

Figure 5:
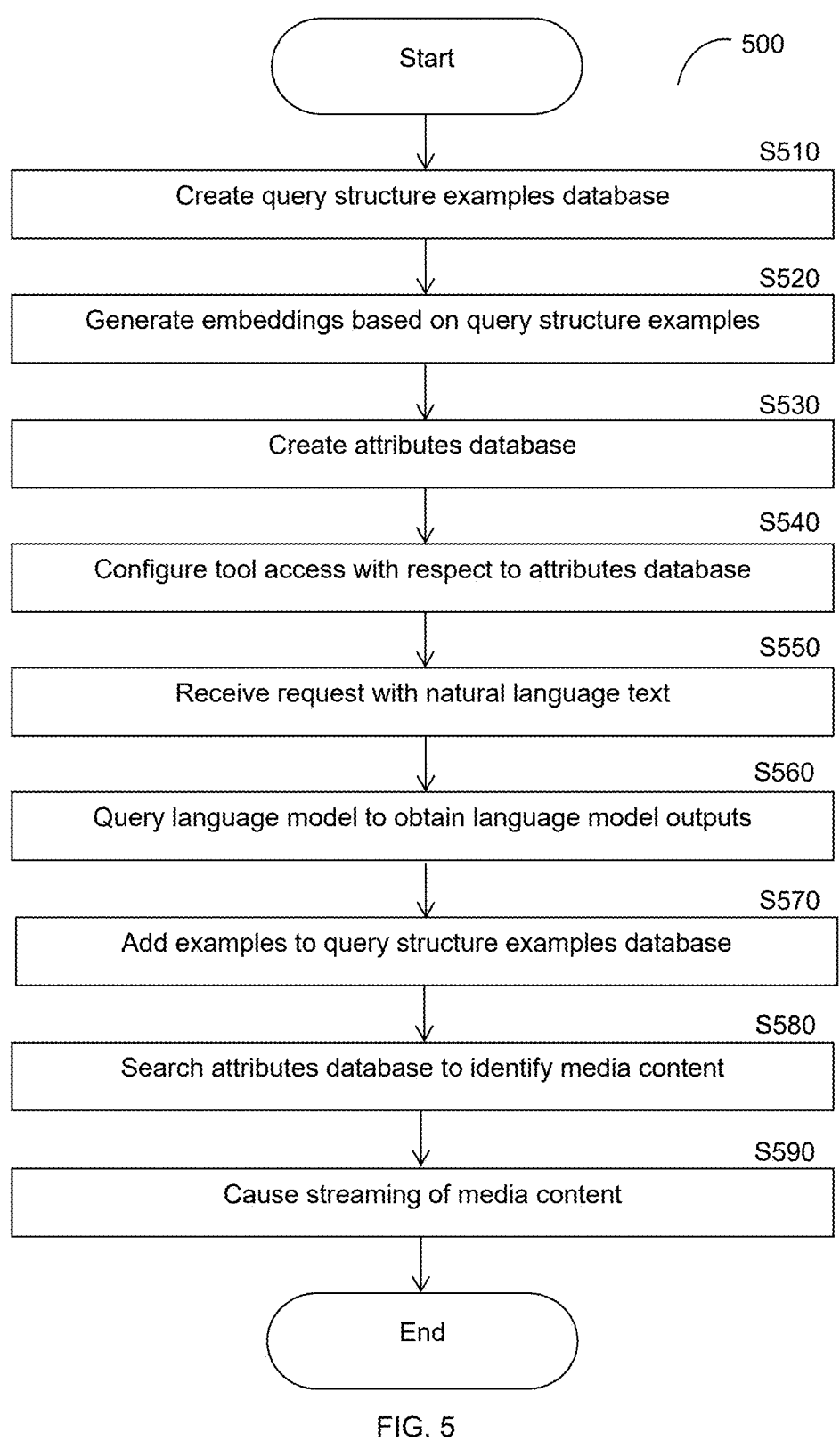
FIG. 5 is a flowchart illustrating a method for responding to natural language queries with respect to multimedia content via a distributed architecture according to an embodiment.

FIG. 5 is a flowchart 500 illustrating a method for responding to natural language queries with respect to multimedia content via a distributed architecture according to an embodiment. In an embodiment, the method is performed by the cloud server 220, FIG. 2.

At S510, a query structure examples database is created. In an embodiment, the query structure examples database includes example query structures which may be loaded to a language model in order to refine outputs of the language model such that structured outputs of the model are refined to comply with a structure recognized by the media content embedding database as discussed herein. As a non-limiting example, a set of 3-5 query structure examples may be dynamically loaded to a LLM and used by the LLM to determine an appropriate structure for outputs to be used as structured queries to a media content database.

The query structure examples include data structures formatted according to a data communication or storage format such as, but not limited to, JavaScript Object Notation (JSON) format. Such data structures include fields to store corresponding values, where a language model may be utilized to determine values for the corresponding fields in order to provide outputs which comply with the data structures represented by the example query structures. This, in turn, allows the language model to translate a query for a media content database received in natural language (for example, as text created based on user inputs) into a structured query in a format recognized by the media content database. That is, this translation effectively allows a user to query a media content database in natural language, for example, in order to retrieve a video showing certain attributes or in order to receive outputs indicating information about video content.

In an embodiment, each query structure example includes both a natural language text example of a question as well as a structured answer to that question (for example, an answer realized as structured text which is structured according to a format used by a database storing media content for media content search or retrieval).

At S520, embeddings are generated based on the example query structures such as, but not limited to, the example query structures stored in the query structure examples database. Each embedding is a reduced representation of at least a portion of one of the example query structures which may be utilized for efficient comparisons. The embeddings may be, for example but not limited to, semantic embeddings created using a semantic embedding process. Such a semantic embedding process may utilize predetermined word embeddings in order to replace original words in text with the closest neighbors to those original words in embedding space, thereby enhancing the representation of semantic meaning in the resulting embedding.

As a non-limiting example, when a query is received containing text in natural language, the text may be embedded using a semantic embedding process and compared to embeddings of query structure examples which were created by embedding portions of query structure examples (for example, by embedding text among the query structure examples) using the semantic embedding process. Thus, embedding the query structure examples facilitates such comparisons.

At S530, an attributes database is created. The attributes database includes data indicating attributes associated with respective media content items or other portions of media content. To this end, the attributes database may include fields containing values representing attributes as well as fields containing values representing media content items or portions of media content having certain attributes.

The values representing media content items or other portions of media content may be strings or other values representing identifiers of certain media content items or other portions of media content which uniquely identify their corresponding portions of media content. That is, a value representing a given portion of media content may be an identifier of that portion of media content which uniquely identifies that portion of media content such that the unique identifier is not associated with or otherwise does not identify any other portion of media content represented in the attributes database. The identifier for each portion of media content may be or may include, an identifier of the media content portion itself, an identifier of a location in storage of the media content portion (for example, a storage location in a storage accessible to an edge device belonging to an entity of the media content), both, and the like. To this end, in embodiments where the media content portion is identified at least partially using an identifier of a storage location of the media content portion, the attribute data may further indicate an edge device or other system which is capable of accessing that storage location which may be utilized to determine which edge device or other system should be used for streaming the media content as discussed further below.

The fields containing attribute values may be organized so that they occupy a portion of the same data structures or substructures to which the corresponding media content identifier values belong. As a non-limiting example, attribute fields may occupy the same columns, rows, or tables as their corresponding media content identifier fields. This organization of attribute fields within the same data structures or substructures as the corresponding media content identifier fields may be utilized to efficiently identify certain media content identifier fields as corresponding to attributes found during searches responsive to requests as discussed herein.

In an embodiment, the attributes database has different subsets corresponding to different entities. To this end, data within the attributes database may include fields containing metadata that indicate the entity for a given subset of data within the attributes database. Such metadata may therefore define different subsets. In a further embodiment, the subsets of data may be defined more granularly, for example, by defining a given subset of data within the attributes database as belonging to a particular sub-entity of a given entity. Such additional granularity may allow for further restricting database access, as a non-limiting example, by allowing users of a parent entity to access attribute data of a child entity but not allowing users of the child entity to access attribute data of the parent entity which is not also assigned to the child entity.

As discussed herein, the attribute data may be used to cause streaming of certain portions of media content. Accordingly, assigning certain subsets of the attribute data to certain entities (for example, via metadata indicating to which entity, sub-entity, or both, a given portion of data belongs) allows for securing the underlying media content by providing another layer of protection against accidental improper access of the media content by unauthorized entities or sub-entities.

At optional S540, one or more tools may be configured in order to provide the tools with access to an attributes database. In an embodiment, each tool is configured with data about the attributes database such as, but not limited to, a location of the attributes database, credentials required to access the attributes database, tenants, or other entities with which different subsets of the attributes database are associated, and the like. Each tool may be, but is not limited to, a function, service, or other set of code configured to access databases.

In a further embodiment, each tool is configured to access only the attributes database, for example, as contrasted with being configured to access other attributes databases or other databases generally. As discussed herein, limiting access to only certain databases may aid in securing data being accessed to respond to requests by preventing accidental data leakage related to retrieving data from one database that belongs to a different entity than the entity which requested data. To this end, in such an embodiment, the tool may be configured only with, as a non-limiting example, the location and access credentials of one or more attributes databases belonging to a given entity.

When the tool is configured only with the location and access credentials of certain attributes databases, the tool may only be capable of accessing those attributes databases, thereby preventing the tool from being used to improperly access data (for example, data belonging to other entities).

In another embodiment, each tool may be configured to access only a subset of the attributes database. For example, different subsets of the attributes database may be accessed using respective credentials, and a given tool may be configured only with credentials for certain subsets of the attributes database but not all subsets of the attributes database.

At S550, a request including natural language text is received. As a non-limiting example, the request may be or may include text from a chatbot session with a user of a user device (for example, one of the user devices 250, FIG. 2). The request therefore acts as a query in natural language text to be processed in order to query a media content database, for example, using a translated version of the natural language text which has been translated into a structured query according to a format used by the media content database. To this end, the request may be realized via a first language model session using a first language model acting as a chatbot.

At S560, a language model is queried in order to obtain a set of language model outputs. In an embodiment, the language model outputs a set of language model outputs including text. In a further embodiment, at least a portion of the text of the language model outputs comply with a format used by a media content embeddings database such that the portion of text may be utilized as a structured query to such a database. The language model may be, but is not limited to, a large language model (LLM).

When the request is realized via a first language model session using a first language model acting as a chatbot, the language model queried at S560 may be a second language model and may act as an interactive query generator to create a structured query during a second language model session. In accordance with various disclosed embodiments, these first and second sessions may be separate sessions which each lacks data from the other session. Additionally, the first and second language models may be, but are not necessarily, different language models (for example, different language models entirely or different instances of the same underlying language model). Using separate models for the chat session with a user in order to obtain the requests in natural language and for the generation of structured queries as described herein may further aid in securing data, for example, by preventing improper access of data by users interacting with the chatbot. Data that is relevant to one session may be provided based on the other session, for example, by providing the natural language request from the first session as inputs for the second session.

An example process for querying a language model which may be utilized at S560 is described further above with respect to FIG. 4.

At optional S570, an example is added to a query structure examples database based on the outputs of the language model. The examples may be added to the database in order to improve processing of subsequent requests, for example, by adding examples which may be closer to potential future text of requests. To this end, in an embodiment, S570 includes generating a query structure example based on the request and the outputs of the language model (i.e., the outputs including the structured query).

As noted above, in an embodiment, each query structure example includes both a natural language text example of a question as well as a structured answer to that question (for example, an answer realized as structured text which is structured according to a format used by a database storing media content for media content search or retrieval). To this end, in a further embodiment, the example to be added to the query structure examples database includes text of the request (for example, the natural language text indicating the attributes or other aspects of the media content to be searched for) as well as at least a portion of the outputs of the language model (for example, a portion of the outputs of the language model that is or includes the structured query).

In some embodiments, the example may be added to the query structure examples database based further on user inputs such as, for example, user inputs indicating whether the resulting structured query is an appropriate result for a given natural language text input. To this end, in such an embodiment, S570 may include presenting the resulting structured query output by the language model to a user (for example, by sending such structured query to a user device for display) and receiving user inputs indicating whether the structured query is correct for a given natural language text input. In this regard, the examples in the query structure examples database may be updated over time and validated by users in order to ensure that additional examples improve accuracy of subsequent structured queries being generated.

At S580, an attributes database is searched based on the language model outputs in order to identify media content which is responsive to the request. In an embodiment, searching the attributes database includes executing the structured query among the language model outputs on the attributes database. As noted above, the structured query may comply with a format used by the attributes database as defined via examples provided to the language model. Also noted herein, the language model may be provided access to tools such as functions which allow the language model to access the attributes database via structured queries. To this end, in some embodiments, the language model may call such a function, thereby triggering searching of the attributes database by the system performing the method of FIG. 5.

In an embodiment, results of searching the attributes database at least include an identifier of media content or a location of media content which is responsive to the request. In a further embodiment, results of searching the attributes database further include an identifier or a network location of an edge node (for example, one of the edge systems 230, FIG. 2) which manages the responsive media content and may be used for streaming or transmitting the media content.

At S590, streaming or otherwise transmission of media content is caused. In an embodiment, the media content is streamed from a system which manages the media content (for example, one of the edge systems 230, FIG. 2) to a device which will play the media content (for example, one of the user devices 250, FIG. 2). To this end, in an embodiment, causing streaming or transmission of the media content includes sending a request to a system which manages the media content. Such a request further indicates a location or otherwise indicates the end device (for example, a user device) to which the media content is to be streamed or transmitted (for example, the user device which submitted an initial natural language text request for media content meeting certain criteria defined with respect to attributes).

In a further embodiment, the media content is not transmitted to or through the system performing the method of FIG. 2 (for example, the cloud server 220, FIG. 2). That is, the media content may be streamed directly from an edge system to a user device while avoiding transmitting the media content to a cloud server or other centralized location.

In an embodiment, streaming the media content includes identifying an edge node (for example, one of the edge systems 230, FIG. 2) to be used for streaming media content based on the language model outputs. In an embodiment, the edge node is an edge node which stores, is configured to access, or is otherwise capable of accessing media content represented in the language model outputs. The edge node may be remote from the system performing the method of FIG. 5. As noted herein, using remote edge nodes to stream the media content directly to the requesting device may allow for avoiding transmitting media content through a central system, thereby avoiding introducing potentially exploitable vulnerabilities for security purposes.

Figure 6:
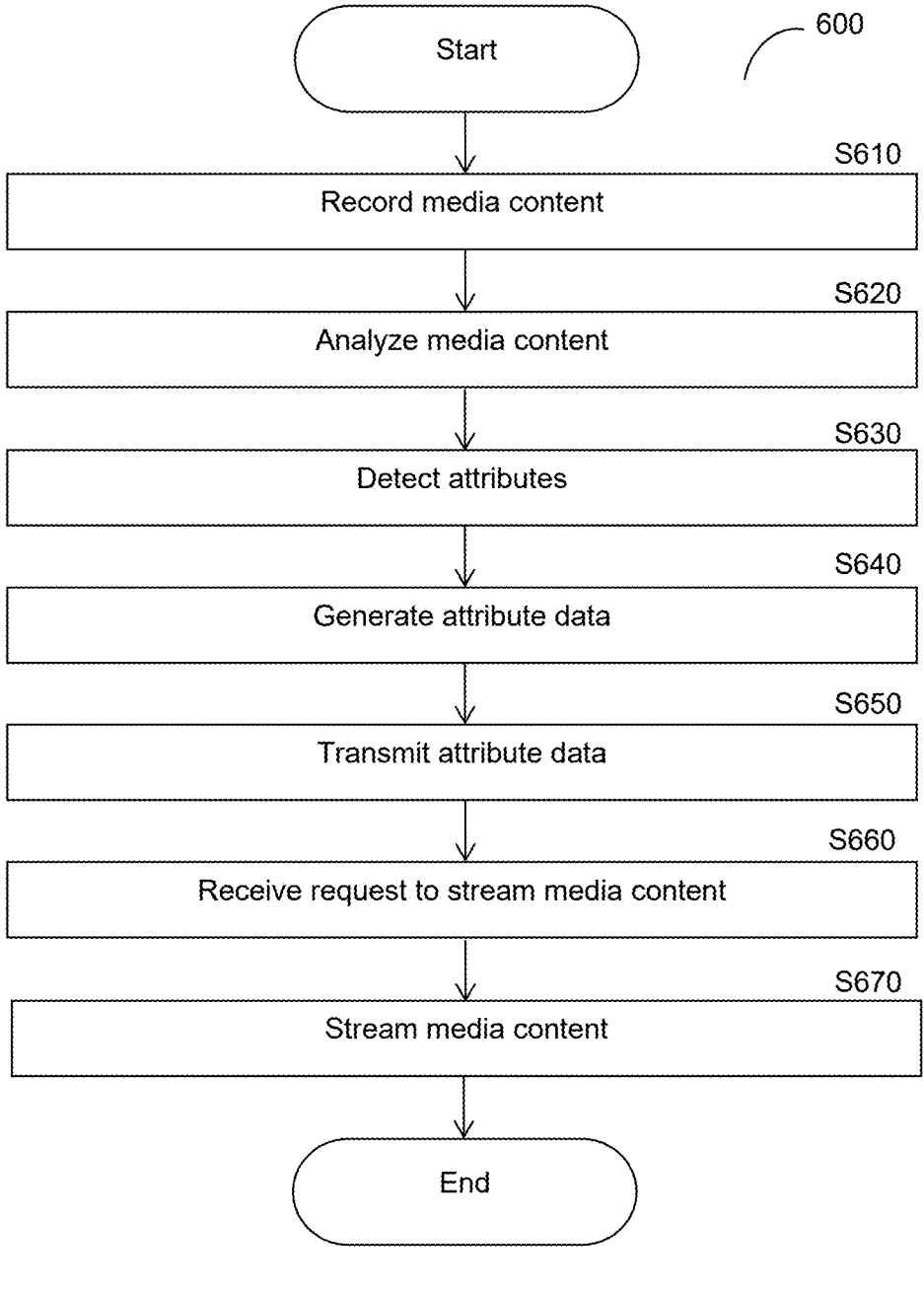
FIG. 6 is a flowchart illustrating a method for providing multimedia content for responses to queries via a distributed architecture according to an embodiment.

FIG. 6 is a flowchart 600 illustrating a method for providing multimedia content for responses to queries via a distributed architecture according to an embodiment. In an embodiment, the method is performed by one of the edge systems 230, FIG. 2.

At S610, media content is obtained. The media content may be or may include, but is not limited to, one or more media content items or portions thereof. Such media content items may be, but are not limited to, images, videos, combinations thereof, portions thereof, and the like. In this regard, a given media content item is a discrete portion of media content which may be assigned respective attribute data based on attributes detected within the media content item as described herein.

Obtaining the media content may include, but is not limited to, recording the media content (for example, via a camera or other sensor included in the system obtaining the media content) or receiving the media content (for example, from a camera or other sensor which captured the media content).

In an embodiment where the method is performed by an edge system in a distributed cloud architecture including one or more edge systems and one or more cloud servers, the media content is processed on edge, that is, by the edge systems and not by the cloud servers. To this end, in a further embodiment, the media content may be obtained from a local sensor or device (i.e., local to the edge system) and not obtained at the cloud server. As discussed herein, storing and processing media content only locally by edge devices or systems without transmitting the media content to the cloud or otherwise to remote systems allows for reducing computing resources associated with transmitting and searching data provided to the cloud as well as improves security by reducing the risk of interception during transmission or inadvertent improper access by the cloud server.

At S620, the media content is analyzed. In an embodiment, the media content is analyzed for potential attributes represented in the media content such as, but not limited to, objects shown in visual content or other visual representations (for example, visual indicators) of attributes. In an embodiment, the media content may be analyzed using one or more computer vision techniques in order to identify objects having certain attributes within visual media content.

In an embodiment, analyzing the media content includes applying a detection machine learning model configured to detect whether a predetermined type of object (for example, objects having one or more predetermined types of attributes) or otherwise whether a predetermined type of attribute is present in a given media content item (for example, an image or video frame). The detected objects or attributes may therefore be among media content items including one or more instances of the predetermined types of objects or attributes. In a further embodiment, the detection machine learning model is trained using at least some synthesized visual content samples, for example as described further below with respect to FIG. 7.

In an embodiment, the attributes are detected by applying one or more attribute detection machine learning model trained to detect objects demonstrating instances of the attributes in media content. Such an attribute detection machine learning model may be a classifier trained to output one or more classifications for input media content which is input to the attribute detection machine learning model. The resulting attributes output by such a classifier for a given portion of media content may be stored as the corresponding attribute data for the portion of media content.

In a further embodiment, the attribute detection machine learning models are trained using at least some synthesized visual content generated with respect to predefined types of attributes. The synthesized visual content may be generated by removing portions of sample visual content showing objects demonstrating certain attributes, and replacing the removed portions with new portions of visual content demonstrating different attributes.

As a non-limiting example, a portion of synthesized video may be created by removing an instance of a purple shirt from a video and replacing the removed purple shirt with a red shirt. To this end, in a further embodiment, synthesizing the visual content further includes analyzing the sample visual content via segmentation in order to identify sets of pixels in each sample representing the relevant objects. The identified sets of pixels may be removed, thereby resulting in removed portion visual content items. The new portions of visual content may be generated by querying a machine learning model such as a diffusion model with a text query prompting the model to replace the removed portion with an object having a target attribute.

An example process for detecting attributes using a machine learning model trained based on synthesized visual content samples is discussed further below with respect to FIG. 7. In such an embodiment, the detected attributes may be added to the media content as visual contents, or the detected attributes may otherwise be used to generated attribute data.

At S630, attributes are detected within the media content based on the analysis. As detected attributes may be or may include, but are not limited to, objects or other visual representations of the attributes.

As noted above, the attributes may be detected using a detection machine learning model which is trained to detect the attributes. To this end, in such an embodiment, the attributes are detected based on the outputs of the detection machine learning model.

At S640, attribute data is generated based on the detected attributes. In an embodiment, the attribute data is one or more sets of metadata associated with respective portions of the media content (for example, portions of the media content corresponding to times at which attributes were detected).

In an embodiment, the attribute data for a given media content item or portion of media content is or includes metadata or other data indicating attributes about the media content item or portion. In a further embodiment, the metadata is or includes textual data having text indicating one or more attributes of the media content.

The attribute data may therefore represent attributes demonstrated by media content stored locally on edge in a distributed architecture including both edge nodes and cloud nodes. The cloud nodes, in turn, may utilize the metadata in order to identify potentially relevant content for responses. To this end, each edge device may analyze the media content stored by the edge device locally in order to identify such attributes.

In accordance with various disclosed embodiments, the attribute data for each set of media content or for each portion of media content has a lower total amount of data than the underlying media content or portion of media content. That is, in such an embodiment, the attribute data uses less computing resources to transmit, store, process, or a combination thereof, as compared to the underlying media content that the attribute data is associated with.

In a further embodiment, the attribute data further includes a timestamp or other indicator of which portion of the media content to which the attribute data corresponds. Such timestamps may be utilized in order to identify relevant portions of media content to be streamed to user devices. That is, in some embodiments, only relevant portions of the media content may be streamed to user devices (i.e., portions of the media content showing attributes indicated in a request), transmission of the relevant portions of the media content may be prioritized (for example, by transmitting the portions of the media content showing attributes indicated in a request before transmitting other portions of the media content), and the like. This may allow for reducing the total amount of data needed to be streamed or otherwise transmitted, or may otherwise allow for streaming the relevant portions of the media content more quickly while eventually streaming the rest of the media content.

In particular, in accordance with various embodiments where the attribute data includes a lower amount of data than the underlying media content associated with the attribute data, transmitting only the attribute data without the media content to the cloud node allows for transmitting, storing, and processing less total data than transmitting both the attribute data and the media content. Additionally, transmitting only the attribute data reduces risks of interception of the underlying media content (and, therefore, exposing more information than necessary in order to search for relevant media content), thereby securing the data in transit and at the cloud node.

At S650, the attribute data is transmitted. In an embodiment, the attribute data is transmitted to a cloud node (for example, the cloud server 220, FIG. 2) of a distributed architecture for use in responding to requests. That is, the cloud node may utilize the attribute data in order to determine which media content or portions of media content are responsive to requests. As a non-limiting example, when attributes detected for a video include green hats, a request with the text "please show me people wearing green hats" may warrant a response including streaming a portion of the video showing the green hats. As discussed herein, the attribute data may be transmitted to and searched by the cloud node more efficiently than the underlying media content.

In some embodiments, the attribute data may be transmitted along with identifiers of the underlying media content (for example, certain media content objects) or portions of media content. The identifiers may be, for example, unique identifiers that are not repeated for any other media content or portion of media content such that each identifier uniquely identifies that media content or portion thereof. These identifiers may be utilized to identify the relevant media content or portion thereof to be streamed when media content having certain attributes is requested. For example, a cloud node may subsequently identify a given video as a media content object to be streamed based on attribute data for that video content, and the cloud node may send, to the system performing the method of FIG. 6, the unique identifier of that video as part of a request to stream media content along with an identifier of a device to which the video should be streamed.

At S660, a request to stream media content is received. The request may be received, for example, from a cloud node such as the cloud node to which the attribute data was transmitted at S650. The request may indicate a media content object or portion of media content to be streamed. The request may further indicate the device (for example, a user device such as one of the user devices 250, FIG. 2) to which the media content is to be streamed as well as the media content or portion of media content (for example, as indicated by a unique identifier of that media content or portion) to be streamed.

At S670, the media content is streamed or otherwise transmitted. In an embodiment, the media content is streamed to a device or system indicated in the request. To this end, in a further embodiment, streaming the media content includes identifying the media content or an applicable portion of the media content to be streamed based on the request. The request may indicate certain attributes, certain times within the media content or other portions of the media content, or both, which may be utilized to identify an applicable portion of the media content to be streamed.

In at least some embodiments, the media content may be streamed directly from the system performing the method of FIG. 6 (for example, one of the edge systems 230, FIG. 2) to a device which will play or otherwise project the media content (for example, one of the user devices 250, FIG. 2) without routing the media content through the system which sent the request to stream the media content (for example, the cloud server 220, FIG. 2). That is, the system which processes the attribute data in order to determine which media content or portion of media content is to be streamed may not receive or otherwise be in the path of transmission of the media content between the system which manages the media content and the system used to play the media content.

As noted above, this may help improving security of the media content by reducing the number of systems or networks through which the media content is transmitted and, in particular, by avoiding transmitting media content owned by different entities through a centralized system. For example, each edge system which manages a set of media content may manage only media content for a given entity or sub-entity. Also noted above, the attribute data may be utilized to facilitate natural language requests for media content without exposing the underlying media content to the cloud server or other centralized system.

Figure 7:
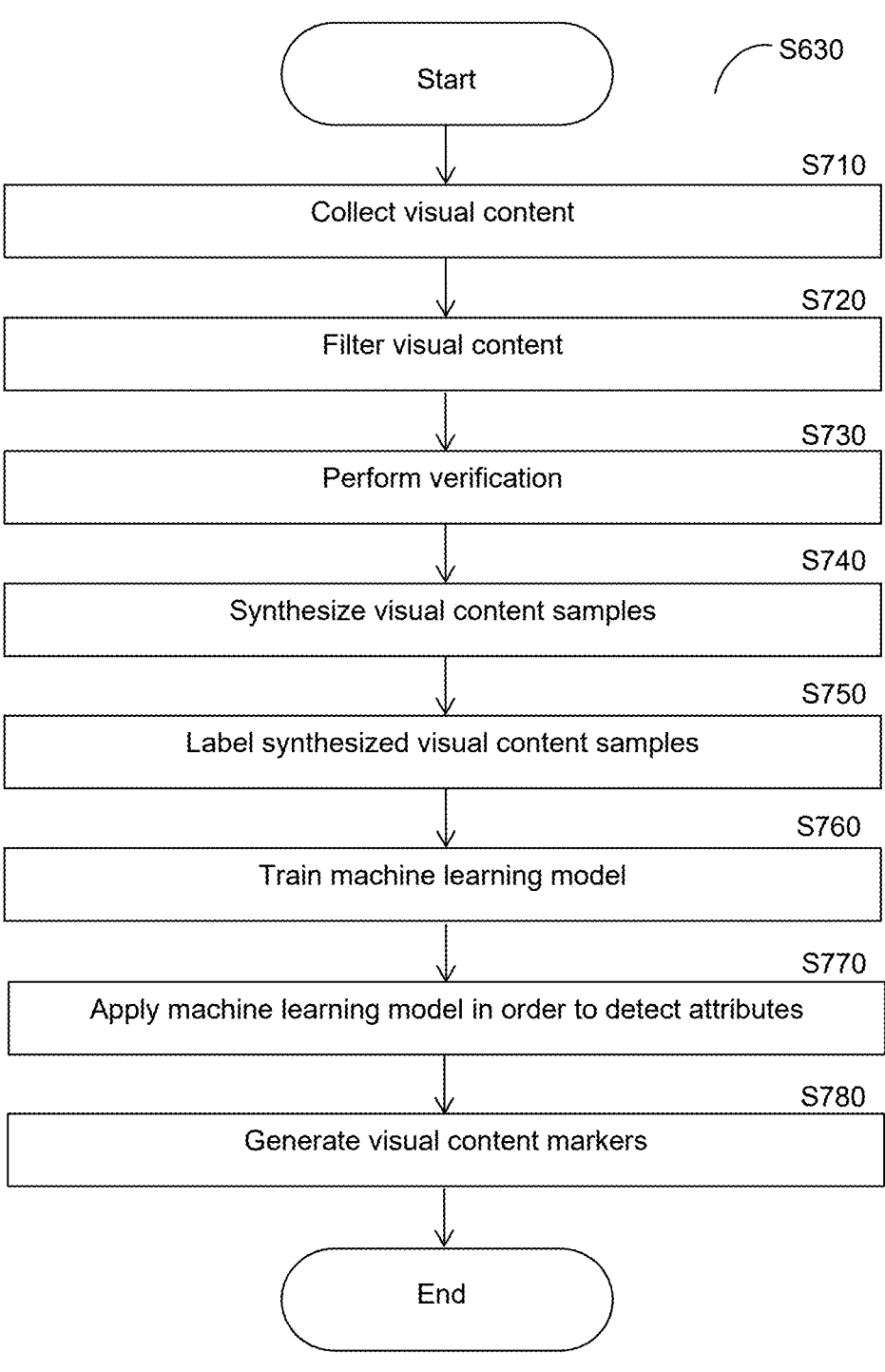
FIG. 7 is a flowchart illustrating a method for detecting attributes using machine learning according to an embodiment.

FIG. 7 is a flowchart S630 illustrating a method for detecting attributes using machine learning according to an embodiment.

At S710, visual content is collected. The visual content may be collected via one or more cameras deployed so as to capture potentially relevant samples, or may be retrieved from one or more databases. At least some of the collected visual content shows instances of a predetermined object (i.e., a type of object such as a shirt or hat) which a machine learning model is to be trained to detect variations of.

At optional S720, the visual content may be filtered. The filtering may be used in order to reduce the amount of samples among the visual content to be labeled, used for training, or otherwise subsequently processed. The filtering may be performed based on filtering criteria which may depend on the implementation such as, but not limited to, criteria defined with respect to shapes of images, of sizes of images, of variety among images (i.e., such that excessive amounts of redundant images which show the same variation of an object over a threshold number of times are filtered out), combinations thereof, and the like.

At optional S730, verification is performed with respect to the visual content. The verification may be performed with respect to certain objects shown in the visual content, which may vary depending on the implementation. As a non-limiting example, it may be verified whether each image or frame among the visual content shows a human. In some implementations, the verification may further include determining whether the same subject (e.g., the same human) is shown in different visual content samples.

At S740, visual content samples are synthesized using at least a portion of the visual content. More specifically, in an embodiment, visual content samples are synthesized using generative artificial intelligence (AI) techniques. The visual content samples are visual content items generated in order to serve as examples of certain variations with respect to predetermined objects (e.g., objects of interest which are pre-designated). To this end, the visual content samples may be alternate versions of visual content items among the visual content which have been edited to replace objects shown in those visual content items with objects demonstrating different variations.

The synthesized visual content samples may demonstrate rare or otherwise uncommon variations such as variations having uncommon colors, shapes, types. As a non-limiting example, visual content samples may be synthesized to show shirt colors which appear relatively infrequently among the visual content samples (e.g., below a predetermined threshold) or otherwise to show desired shirt colors for a given implementation. Alternatively or in combination, the synthesized visual content samples may demonstrate variations that remove the object entirely and replace it with an entirely different object. As a non-limiting example, visual content samples may be synthesized to remove hats from existing visual samples (e.g., by replacing hats shown in the visual content samples with hair or otherwise with visual content representing a top of a human's head).

In a further embodiment, synthesizing the samples includes segmenting content with respect to the predetermined objects, removing portions of content showing the predetermined objects out of existing samples among the visual content, using a generative machine learning model to generate portions of content to be used to replace the removed portions of content, combinations thereof, and the like. An example process for synthesizing data which may be utilized at S740 is described further in U.S. patent application Ser. No. 18/539,897, assigned to the common assignee, the contents of which are hereby incorporated by reference.

At optional S750, the synthesized visual content samples may be labeled. More specifically, as noted above, each synthesized visual content sample is a visual content item which is generated with respect to a particular variation of an object. Such variations may include, but are not limited to, color, shape, type, presence, or absence (i.e., whether the object is present in the image or not), combinations thereof, portions thereof, and the like. The synthesized visual content samples may be labeled based on the respective variations shown in each of the synthesized visual content samples. Such labeling may be used in order to facilitate training the machine learning model at S760 using the synthesized visual content samples via supervised machine learning.

In some implementations, S750 may include providing the synthesized visual content samples to human operators for annotation in order to obtain the labels. In other implementations, the synthesized visual content samples may be automatically labeled, for example, based on textual inputs used during creation of the synthesized visual content samples or otherwise based on classifications indicating variations each synthesized visual content sample is created to represent.

At S760, a machine learning model is trained. In an embodiment, the machine learning model is trained at least using the synthesized visual content samples and at least a portion of other visual content (such as, but not limited to, the visual content collected at S710 which was used to generate the synthesized visual content samples). In other words, the machine learning model may be trained using at least some samples from a first set of visual content samples as well as at least some samples from a second set of visual content samples, where the second set of visual content samples includes synthesized visual content samples created based on at least a portion of the first set of visual content samples.

In an embodiment, the machine learning model is trained such that the machine learning model is configured to output classifications or other predictions defined with respect to one or more predetermined objects when applied to inputs including visual content items such as images or video frames. The machine learning model may be further configured to output likelihood scores for its predictions. Each likelihood score may indicate a degree of likelihood that a respective prediction is correct, and may be used for purposes such as determining whether to output certain predictions using thresholds as discussed further below.

In a further embodiment, the machine learning model is trained using supervised machine learning based on a training set including training visual content items and corresponding variation labels, where each variation label corresponds to a respective training visual content item and may indicate a classification defined with respect to an object (e.g., a color of the object, a shape of the object, a type of the object, whether the object is present or not, and the like). As noted above, the training visual content items at least include the synthesized visual content samples, and may further include any or all of the original visual content samples based on which the synthesized visual content samples were created.

In some embodiments, the synthesized visual content samples are variants of respective original visual content samples which were used to create the synthesized visual content samples (e.g., visual content samples among the visual content collected at S710) such that the synthesized visual content samples show, for example but not limited to, the same people, animals, other objects, or environments as the original visual content samples, but with a different variation of one or more predetermined objects shown therein. As a non-limiting example, when the original visual content samples include an image of a particular person wearing a red shirt that is used to create a synthesized visual content sample showing that same person having the shirt replaced with a purple shirt, the machine learning model is trained using both the original red shirt visual content sample showing that person as well as the variant synthesized purple shirt visual content sample showing that person. Using images of the same person featuring different variations of objects may further improve the training of the machine learning model by effectively highlighting the relevant differences between variations.

At S770, the machine learning model is applied to subsequent visual content. For example, the machine learning model is applied to subsequent visual content in order to determine a variation of objects shown in the subsequent visual content, whether the object is present in the subsequent visual content, both, and the like. As a non-limiting example, the machine learning model may be applied to video frames showing people in order to detect colors of shirts worn by the people shown in the video frames. As another non-limiting example, the machine learning model may be applied to images showing people at construction sites in order to detect whether each person is wearing a hard hat or not.

As discussed herein, the machine learning model trained using synthesized samples is trained to more accurately recognize instances of rare or otherwise uncommon variations (e.g., variations of characteristics such as color) that are observed infrequently among the data used to train the machine learning model. Accordingly, the machine learning model applied at S770 is trained to more accurately than without the synthesized samples. Further, the machine learning model may be tuned, have thresholds adjusted, or both, in order to further improve the performance of the model such that the resulting outputs are more accurate when applied at S770.

At optional S780, visual content markers may be generated and added to the media content. The visual content markers may be located proximate to objects having the detected attributes or other portions of the media content illustrating the detected attributes. As a non-limiting example, the visual content markers may highlight or surround portions of the media content representing detected attributes, and may therefore visually distinguish those portions from other portions of the media content. To this end, in an embodiment, the visual content markers are bounding boxes surrounding portions of the media content showing the objects having the detected attributes or otherwise surrounding portions of the media content having the detected attributes.

Figure 8:
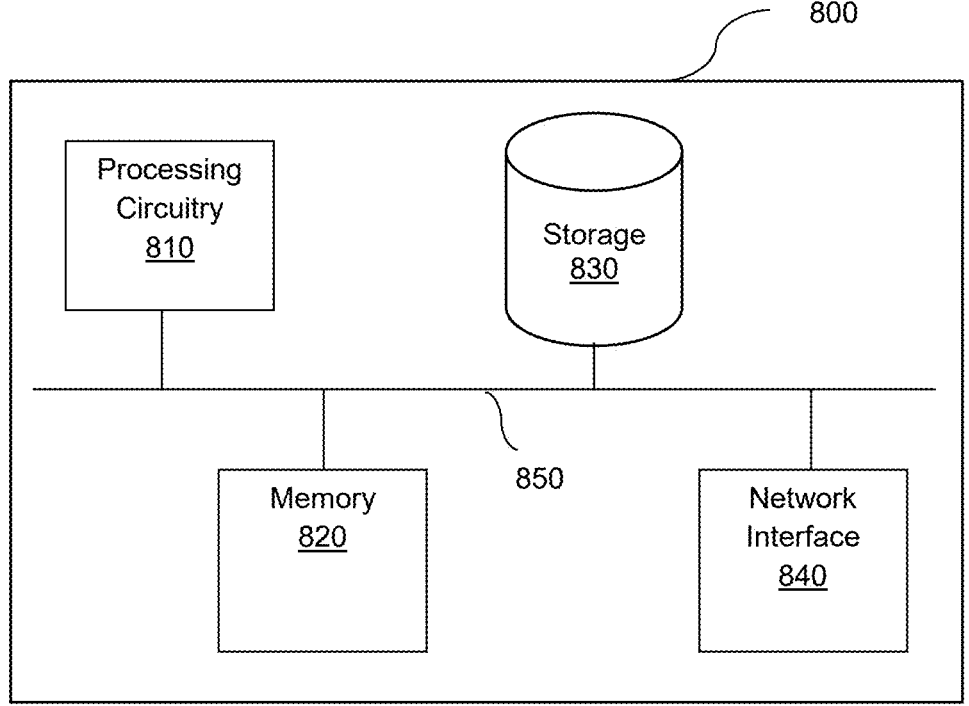
FIG. 8 is a schematic diagram of a multimedia agent server according to an embodiment.

FIG. 8 is an example schematic diagram of a multimedia agent server 230 according to an embodiment. The hardware layer 800 includes a processing circuitry 810 coupled to a memory 820, a storage 830, and a network interface 840. In an embodiment, the components of the multimedia agent server 230 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the multimedia agent server 230 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

Figure 9:
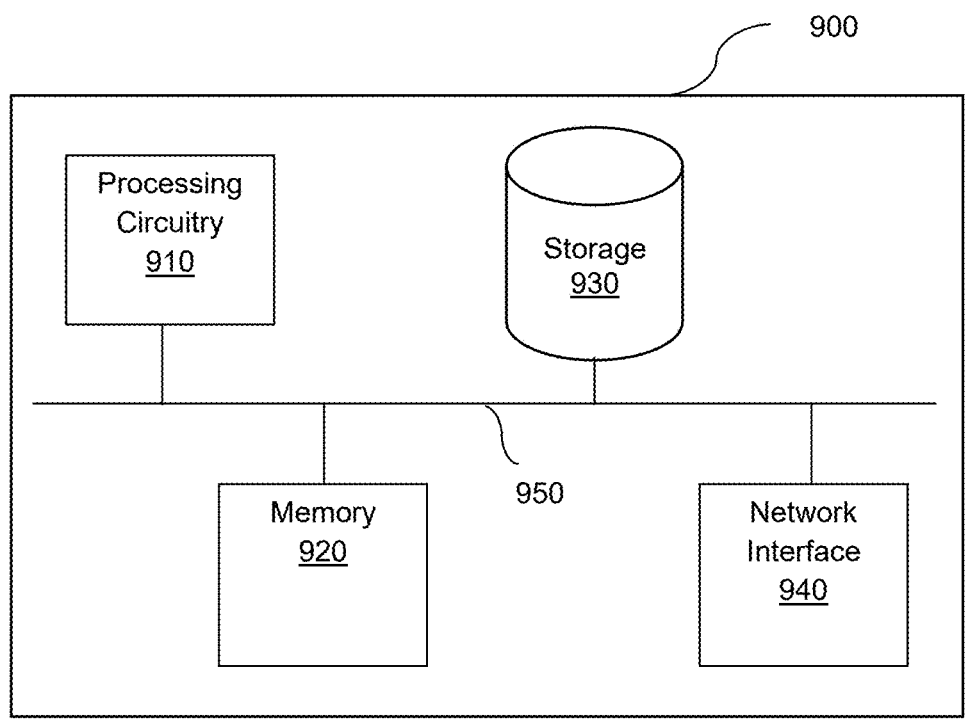
FIG. 9 is a schematic diagram of a hardware layer used to realize a cloud node according to an embodiment.

FIG. 9 is an example schematic diagram of a hardware layer 900 which may be utilized to realize a cloud node (for example, the cloud node 215) according to an embodiment.

The hardware layer 900 includes a processing circuitry 910 coupled to a memory 920, a storage 930, and a network interface 940. In an embodiment, the components of the hardware layer 900 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the hardware layer 900 to communicate with other systems, devices, components, applications, or other hardware or software components, for example as described herein.

It should be understood that the embodiments described herein are not limited to the specific architecture illustrated in FIG. 9, and other architectures may be equally used without departing from the scope of the disclosed embodiments.

Figure 10:
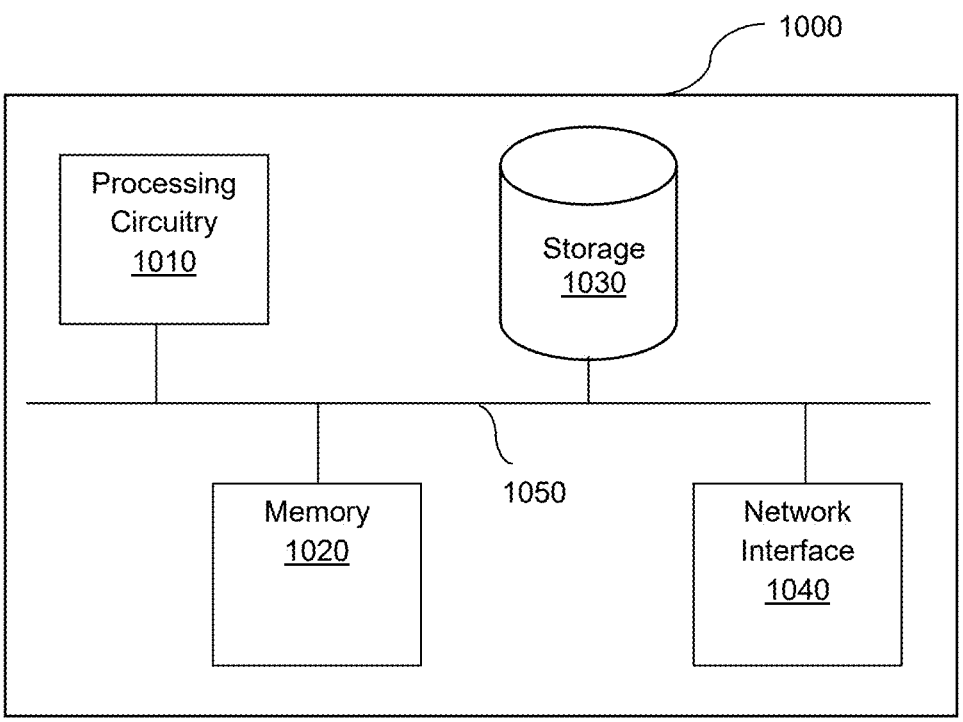
FIG. 10 is a schematic diagram of a hardware layer used to realize an edge node according to an embodiment.

FIG. 10 is an example schematic diagram of a hardware layer 1000 according to an embodiment. The hardware layer 1000 may be used to realize, for example, one of the edge systems 230, FIG. 2. The hardware layer 1000 includes a processing circuitry 1010 coupled to a memory 1020, a storage 1030, and a network interface 1040. In an embodiment, the components of the hardware layer 1000 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read only memory, flash memory, etc.), or a combination thereof.

In one configuration, software for implementing one or more embodiments disclosed herein may be stored in the storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1010, cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1040 allows the hardware layer 1000 to communicate with other systems, devices, components, applications, or other hardware or software components, for example as described herein.

It should be understood that the embodiments described herein are not limited to the specific architecture illustrated in FIG. 10, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for structured querying, comprising:

embedding text of a request in order to create an embedding of the text of the request;

comparing the embedding of the text of the request to at least a portion of each of a plurality of query structure examples during a comparison, wherein each query structure example of the plurality of query structure examples includes a natural language text portion and a structured query portion, wherein the structured query portion of each query structure example is structured according to a format used by a database, wherein the comparison includes comparing the embedding of the text of the request to a plurality of embeddings of the plurality of query structure examples, wherein the embedding of the at least a portion of each of the plurality of query structure examples is a reduced representation of the at least a portion of the query structure example;

identifying at least one matching query structure example among the plurality of query structure examples based on the comparison;

generating a first query based on the at least one matching query structure example and the text of the request;

providing the first query to a language model in order to obtain a set of outputs from the language model; and querying at least a portion of the database using a second query, wherein the second query is based on the set of outputs from the language model, wherein the second query is structured according to the format used by the database, wherein the at least a portion of the database is queried by a first system, wherein a plurality of media content items is stored in a plurality of storages accessible to a plurality of second systems;

causing transmission of at least a portion of at least one media content item among the plurality of media content items from the plurality of second systems to a third system, wherein the at least one media content item is determined based on the results of querying the at least a portion of the database using the second query performed by the first system, wherein causing the transmission of the at least a portion of the identified at least one media content item further includes sending a corresponding identifier for each of the at least one media content item to a respective second system of the plurality of second systems which is configured to access a respective storage among the plurality of storages in which the media content item is stored.

2. The method of claim 1, further comprising:

providing at least one function to the language model, wherein the at least one function is configured to access the database when called by the language model, wherein the set of outputs from the language model includes at least one call to the at least one function.

3. The method of claim 2, wherein the request is from a first entity of a plurality of entities, wherein the database includes a plurality of subsets, wherein each subset of the database corresponds to a respective entity of the plurality of entities, wherein the at least one function is configured to limit access by the language model to only at least one subset of the plurality of subsets corresponding to the first entity.

4. The method of claim 1, wherein the request is from a first entity of a plurality of entities, wherein the database includes a plurality of subsets, wherein each subset of the database corresponds to a respective entity of the plurality of entities, further comprising:

identifying at least one first subset among the plurality of subsets which corresponds to the first entity, wherein only the at least one first subset of the database is queried using the second query.

5. The method of claim 1, wherein the request indicates at least one attribute of a plurality of attributes in natural language, further comprising:

defining an event with respect to the at least one attribute;

analyzing media content in order to detect the event in at least one portion of the media content; and causing streaming of the at least one portion of the media content when the event is detected.

6. The method of claim 1, wherein the request is received via a first language model session with a first language model, wherein the language model to which the first query is provided is a second language model, wherein the first query is provided to the second language model during a second language model session.

7. The method of claim 1, wherein the database stores attribute data indicating a plurality of attributes identified within a plurality of media content items, wherein results of querying the database using the second query include at least one instance of at least one attribute among the plurality of attributes, further comprising:

identifying the at least one media content item among the plurality of media content items as including the at least one attribute based on the results of querying the database using the second query.

8. The method of claim 1, wherein the first system is a cloud server, wherein each of the plurality of second systems is an edge system, wherein the first system is remote from each of the plurality of second systems.

9. A non-transitory computer-readable medium having stored thereon instructions for causing a processing circuitry to execute a process, the process comprising:

embedding text of a request in order to create an embedding of the text of the request;

comparing the embedding of the text of the request to at least a portion of each of a plurality of query structure examples during a comparison, wherein each query structure example of the plurality of query structure examples includes a natural language text portion and a structured query portion, wherein the structured query portion of each query structure example is structured according to a format used by a database, wherein the comparison includes comparing the embedding of the text of the request to a plurality of embeddings of the plurality of query structure examples, wherein the embedding of the at least a portion of each of the plurality of query structure examples is a reduced representation of the at least a portion of the query structure example;

identifying at least one matching query structure example among the plurality of query structure examples based on the comparison;

generating a first query based on the at least one matching query structure example and the text of the request;

providing the first query to a language model in order to obtain a set of outputs from the language model; and querying at least a portion of the database using a second query, wherein the second query is based on the set of outputs from the language model, wherein the second query is structured according to the format used by the database, wherein the at least a portion of the database is queried by a first system, wherein a plurality of media content items is stored in a plurality of storages accessible to a plurality of second systems;

causing transmission of at least a portion of at least one media content item among the plurality of media content items from the plurality of second systems to a third system, wherein the at least one media content item is determined based on the results of querying the at least a portion of the database using the second query performed by the first system, wherein causing the transmission of the at least a portion of the identified at least one media content item further includes sending a corresponding identifier for each of the at least one media content item to a respective second system of the plurality of second systems which is configured to access a respective storage among the plurality of storages in which the media content item is stored.

10. A system for structured querying, comprising:

a processing circuitry; and a memory, the memory containing instructions that, when executed by the processing circuitry, configure the system to:

embed text of a request in order to create an embedding of the text of the request;

compare the embedding of the text of the request to at least a portion of each of a plurality of query structure examples during a comparison, wherein each query structure example of the plurality of query structure examples includes a natural language text portion and a structured query portion, wherein the structured query portion of each query structure example is structured according to a format used by a database, wherein the system is further configured to compare the embedding of the text of the request to a plurality of embeddings of the plurality of query structure examples, wherein the embedding of the at least a portion of each of the plurality of query structure examples is a reduced representation of the at least a portion of the query structure example;

identify at least one matching query structure example among the plurality of query structure examples based on the comparison;

generate a first query based on the at least one matching query structure example and the text of the request;

provide the first query to a language model in order to obtain a set of outputs from the language model; and query at least a portion of the database using a second query, wherein the second query is based on the set of outputs from the language model, wherein the second query is structured according to the format used by the database, wherein the at least a portion of the database is queried by a first system, wherein a plurality of media content items is stored in a plurality of storages accessible to a plurality of second systems;

cause transmission of at least a portion of at least one media content item among the plurality of media content items from the plurality of second systems to a third system, wherein the at least one media content item is determined based on the results of querying the at least a portion of the database using the second query performed by the first system, wherein causing the transmission of the at least a portion of the identified at least one media content item further includes sending a corresponding identifier for each of the at least one media content item to a respective second system of the plurality of second systems which is configured to access a respective storage among the plurality of storages in which the media content item is stored.

11. The system of claim 10, wherein the system is further configured to:

provide at least one function to the language model, wherein the at least one function is configured to access the database when called by the language model, wherein the set of outputs from the language model includes at least one call to the at least one function.

12. The system of claim 11, wherein the request is from a first entity of a plurality of entities, wherein the database includes a plurality of subsets, wherein each subset of the database corresponds to a respective entity of the plurality of entities, wherein the at least one function is configured to limit access by the language model to only at least one subset of the plurality of subsets corresponding to the first entity.

13. The system of claim 10, wherein the request is from a first entity of a plurality of entities, wherein the database includes a plurality of subsets, wherein each subset of the database corresponds to a respective entity of the plurality of entities, wherein the system is further configured to:

identify at least one first subset among the plurality of subsets which corresponds to the first entity, wherein only the at least one first subset of the database is queried using the second query.

14. The system of claim 10, wherein the request indicates at least one attribute of a plurality of attributes in natural language, wherein the system is further configured to:

define an event with respect to the at least one attribute;

analyze media content in order to detect the event in at least one portion of the media content; and cause streaming of the at least one portion of the media content when the event is detected.

15. The system of claim 10, wherein the request is received via a first language model session with a first language model, wherein the language model to which the first query is provided is a second language model, wherein the first query is provided to the second language model during a second language model session.

16. The system of claim 10, wherein the database stores attribute data indicating a plurality of attributes identified within a plurality of media content items, wherein results of querying the database using the second query include at least one instance of at least one attribute among the plurality of attributes, wherein the system is further configured to:

identify the at least one media content item among the plurality of media content items as including the at least one attribute based on the results of querying the database using the second query.

17. The system of claim 10, wherein the first system is a cloud server, wherein each of the plurality of second systems is an edge system, wherein the first system is remote from each of the plurality of second systems.

* * * * *